United States Patent
Antony et al.

(10) Patent No.: US 10,204,082 B2
(45) Date of Patent: Feb. 12, 2019

(54) GENERATING DIGITAL DOCUMENT CONTENT FROM A DIGITAL IMAGE

(71) Applicant: DROPBOX, INC., San Francisco, CA (US)

(72) Inventors: Mathew Antony, Austin, TX (US); Michael Q. Wu, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 15/475,599

(22) Filed: Mar. 31, 2017

(65) Prior Publication Data
US 2018/0285321 A1 Oct. 4, 2018

(51) Int. Cl.
G06F 17/00 (2006.01)
*G06F 17/21* (2006.01)
*G06F 17/24* (2006.01)
*G06F 17/30* (2006.01)

(52) U.S. Cl.
CPC .......... *G06F 17/212* (2013.01); *G06F 17/245* (2013.01); *G06F 17/246* (2013.01); *G06F 17/30106* (2013.01); *G06F 17/30268* (2013.01)

(58) Field of Classification Search
CPC ............. G06F 17/212; G06F 17/30106; G06F 17/30268
USPC ........................................ 715/256, 263, 268
See application file for complete search history.

(56) References Cited

U.S. PATENT DOCUMENTS

| | | | | |
|---|---|---|---|---|
| 5,583,543 A | * | 12/1996 | Takahashi | G06F 3/038 345/173 |
| 5,715,443 A | * | 2/1998 | Yanagihara | G06F 17/30634 |
| 8,239,357 B1 | * | 8/2012 | Kirkpatrick | G06F 17/30011 707/705 |
| 2003/0007018 A1 | * | 1/2003 | Seni | G06F 3/0237 715/864 |
| 2007/0013967 A1 | * | 1/2007 | Ebaugh | G06F 17/30613 358/448 |
| 2008/0008387 A1 | * | 1/2008 | Cheng | G06K 9/00422 382/186 |

(Continued)

FOREIGN PATENT DOCUMENTS

WO WO 2018/182790 10/2018

OTHER PUBLICATIONS

Konishi et al., Data Model and Architecture of a Paper-Digital Document Management System, ACM 2007, pp. 29-31.*

(Continued)

*Primary Examiner* — Cong-Lac Huynh
(74) *Attorney, Agent, or Firm* — Keller Jolley Preece

(57) ABSTRACT

One or more embodiments of systems and methods for a digital content management system for creating a digital document from handwritten content are described herein. For example, the digital content management system receives a digital image of handwritten content and analyzes the digital image to identify handwritten content as well as to identify specific command indicators. In response to identifying a command indicator associated with a command to create a digital document, the digital content management system creates a new digital document and adds digital content portions to the digital document that correspond to the identified content portions identified within the handwritten content depicted within the digital image.

20 Claims, 11 Drawing Sheets

(56) References Cited

U.S. PATENT DOCUMENTS

| | | | |
|---|---|---|---|
| 2012/0041955 A1* | 2/2012 | Regev | G06F 17/3071 |
| | | | 707/740 |
| 2014/0002384 A1 | 1/2014 | Li et al. | |
| 2014/0019905 A1 | 1/2014 | Kim et al. | |
| 2014/0344662 A1 | 11/2014 | Isabel et al. | |
| 2015/0046488 A1* | 2/2015 | Liao | G06F 17/30268 |
| | | | 707/769 |
| 2015/0062041 A1* | 3/2015 | Kim | G06F 3/0412 |
| | | | 345/173 |
| 2015/0370473 A1* | 12/2015 | Chen | G06F 1/1626 |
| | | | 345/174 |
| 2016/0140509 A1* | 5/2016 | Beulick | G06Q 10/1095 |
| | | | 705/7.19 |
| 2016/0259766 A1* | 9/2016 | Ivanov | G06F 17/241 |
| 2017/0068436 A1* | 3/2017 | Auer | G06F 3/04883 |
| 2017/0178034 A1* | 6/2017 | Skeen | G06F 17/30389 |
| 2017/0212612 A1* | 7/2017 | Zhou | G06F 3/03545 |

OTHER PUBLICATIONS

Chiu et al., LiteMinutes: An Internet-based System for Multimedia Meeting Minutes, ACM 2001, pp. 140-149. (Year: 2001).*
International Search Report & Written Opinion as received in PCT/US2017/060212 dated Feb. 1, 2018.

* cited by examiner

GENERATING DIGITAL DOCUMENT CONTENT FROM A DIGITAL IMAGE

BACKGROUND

People attending and participating in meetings often find laptop computers and other electronic devices to be a distraction. For many people, paying full attention to more than one area of focus is difficult. Such is the case when an individual attends a meeting with a laptop computer. The individual struggles to hear/understand every point made by a speaker while simultaneously taking notes on the laptop computer. Often, this results in the individual splitting (e.g., alternating) his or her attention between the computer screen and the instructor, which results in the individual likely missing various details of what the speaker is communicating. Due to the difficulties of maintaining sufficient attention to a speaker, while also interacting with an electronic device, many people opt not use electronic devices during meetings. In some cases, individuals opt for taking hand written notes (e.g., on a whiteboard or notepad), while others take no notes and instead focus on the person speaking. Unfortunately, a problem arises, for example, when an individual wants to recall or review items discussed from the meeting.

As a result, various conventional systems exist that allow an individual to capture and later view an image of handwritten notes (e.g., a digital photo of a whiteboard or notepad). Although conventional systems enable an individual to view the digital image of handwritten notes on a computer or other electronic device, conventional systems often provide the image in a confining environment by limiting the individual to viewing the digital image on an electronic device in essentially the same way as viewing a photograph of the handwritten notes.

Accordingly, while conventional systems can enable an individual to later view handwritten notes captured in a digital image, these systems fail to allow an individual to easily and efficiently edit the image of handwritten notes, supplement the image of handwritten notes with additional content, incorporate the handwritten notes into other electronic documents, and/or collaborate with other users using the handwritten notes. Thus, conventional systems fail to provide individuals with an effective way to utilize handwritten notes within a digital environment, thereby dissuading individuals from utilizing handwritten notes altogether.

Due to the above-discussed reasons, conventional systems do not provide solutions to allow users to increase their attentiveness during meetings because conventional systems do not provide an easy and effective way of enabling users to incorporate handwritten notes into a manageable, editable, and collaborative electronic document. Thus, there are several disadvantages with regard to conventional systems and methods.

SUMMARY

One or more embodiments described herein provide benefits and/or solve one or more of the foregoing or other problems in the art with systems and methods for easily and efficiently incorporating handwritten content into an editable, shareable, and collaborative digital document. For example, the systems and methods receive a digital image of handwritten content (e.g., a digital photo of a whiteboard) and analyze the handwritten content to generate and add corresponding digital content to a digital document. In particular, the systems and methods determine a content type of a content portion of handwritten content (e.g., text, figures, etc.), and create a corresponding digital content portion within a digital document.

Moreover, the systems and methods analyze the digital image to identify command indicators (e.g., handwritten symbols or commands that are digitally recognizable) that specify various commands related to incorporating handwritten content into a digital document. For example, based on identifying command indicators within the handwritten content, the systems and methods incorporate handwritten content within the digital image into a previously created digital document, or alternatively, the systems and methods create a new digital document within which the system incorporates the handwritten content. Moreover, by identifying command indicators, the systems and methods can also share the digital document with specified users and groups. Accordingly, the systems and methods enable a user to use handwritten notes to collaborate on a project with other users by, for example, turning handwritten content on a whiteboard into a collaborative digital workspace shared with other users.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

DETAILED DESCRIPTION

Figure 1:
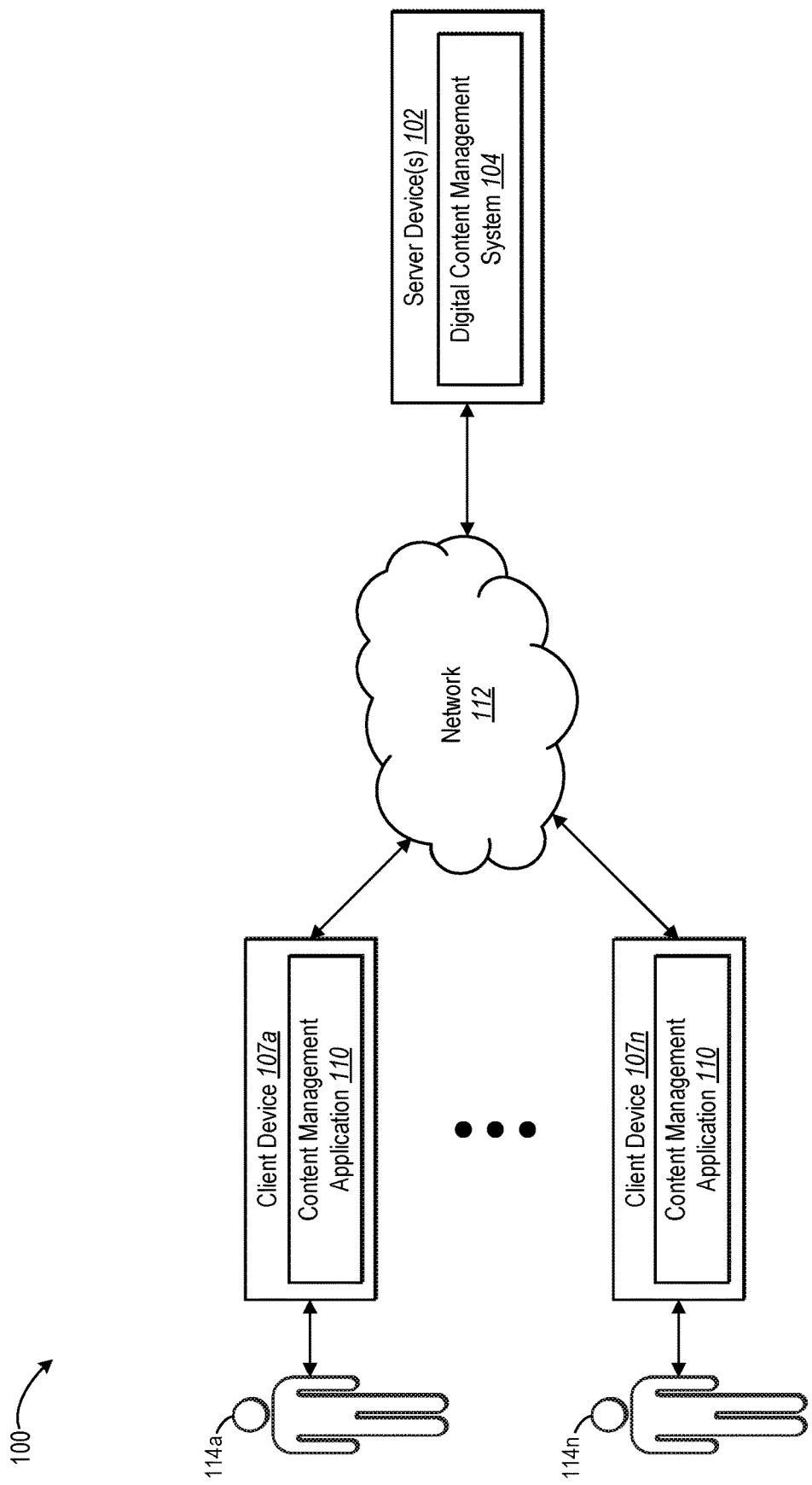
FIG. 1 illustrates a schematic diagram of a computing environment in accordance with one or more embodiments.

Embodiments of the present disclosure provide a digital content management system that creates a digital document from an image of handwritten content. In particular, the digital content management system receives a digital image (e.g., a picture, a photograph, a scanned image, etc.) of handwritten content, where the handwritten content includes a command indicator and a content portion. Additionally, the digital content management system analyzes the digital image to identify the command indicator and the content portion depicted within the digital image. Furthermore, based on a command associated with the command indicator, the digital content management system adds the content portion to a digital document and/or shared the digital document with one or more other users.

In one or more embodiments, the digital content management system identifies a handwritten content portion (e.g., a section of text, a figure, a chart, etc.) within the digital image of handwritten content. Based on a type of content and/or characteristics of the content within the handwritten content portion, the digital content management system converts the handwritten content portion into a digital content portion to include in a digital document. Accordingly, by identifying handwritten content having specific characteristics, and converting the handwritten content based on the characteristics of a particular portion, the digital content management system seamlessly incorporates various types of handwritten content into a digital document that is editable and manipulable by a user of a computer or other electronic device.

In addition to converting handwritten content on a portion-by-portion basis, one or more embodiments of the digital content management system converts handwritten content within a digital image into digital content to include in a digital document while maintaining formatting characteristics of the handwritten content. For example, the digital content management system analyzes the digital image to identify format characteristics within the digital image, such as margins, content size, content style, content location within the digital image, as well as content arrangement with (e.g., content location with respect to other portions of content). In some embodiments, the digital content management system identifies a number of different content portions and detects a number of format characteristics associated with the content portions. Accordingly, the digital content management system applies the formatting characteristics identified within the digital image of handwritten content to the digital content within the digital document.

To illustrate, in one or more embodiments, the digital content management system identifies a text header within a digital image of handwritten content followed by a bulleted list of items within the handwritten content. In response, the digital content management system creates a digital header with the same format style (e.g., all caps, underlined, font size, etc.) to add to a digital document, and creates a bulleted list to add to the digital document to reflect the format style of the handwritten list. Additionally, the digital content management system arranges the header and the bulleted list identified within the digital document in a similar arrangement (e.g., location) as identified within the image of handwritten content. In any case, the digital content management system applies the detected format characteristics to content portions added to the digital document to correspond to the format characteristics of the handwritten content.

In addition to identifying content portions and formatting characteristics associated with a content portion, the digital content management system also analyzes the digital image of handwritten content to identify one or more command indicators. As discussed in detail below with reference to the figures, a command indicator includes a handwritten word or phrase, and/or handdrawn shape or symbol, that is associated with a specific command or feature within the digital content management system (e.g., create a new document or add content to an existing document). Accordingly, while taking notes on a whiteboard, for example, a user can include one or more command indicators within the notes that cause the digital content management system to process the handwritten content and perform various functions, thus allowing a user to remain attentive to a meeting, while at the same time providing an efficient way for the user to interact with the digital content management system.

More specifically, in some embodiments, the digital content management system identifies a command tag associated with a command indicator within a digital image. For example, a command tag is handwritten information that a user pairs with a command indicator within the handwritten content (e.g., user ID, file name, date and time, group ID, etc.). The digital content management system identifies a particular command indicator, identifies a command tag associated with the command indicator, and performs the command associated with the identified command indicator using the information from the command tag. Accordingly, based on identifying a command indicator and an associated command tag, the digital content management system can create a digital document, access a previously saved digital document, add files stored on the digital content management system to a digital document, invite users to access a digital document, generate and send meeting invites to users, generate and share task lists, as well as perform other actions.

As an example, in some embodiments, the digital content management system identifies a command indicator associated with a command to search a database of digital content for a document with a specific file name specified within the command tag paired with the command indicator (e.g., the command indicator "+" paired with the command tag "Meeting Minutes," as discussed below with respect to FIG. 3). The digital content management system searches the database for the document with the file name matching the command tag, and upon locating the digital document with the matching file name, the digital content management system adds digital content corresponding to the handwritten content identified within the digital image to the digital document. Furthermore, in some embodiments, in response to determining that a document with a matching file name does not exist within the database, the digital content management system creates a new digital document, names the new digital document with the file name, and incorporates digital content corresponding to the handwritten content within the digital image to the new digital document.

In addition to accessing a previously created digital document or creating a new digital document, various other command indicators cause the digital content management system to perform additional functions. For example, a user can include one or more command indictors within the handwritten content that cause the digital content system to invite users to view the digital document, grant user's specific rights to the digital document (read-only, edit, etc.), add the digital document to a collaborative workspace within the content management system, create a calendar invite, and/or perform additional functions. Accordingly, not only are a user's handwritten notes included in a digital document, but the digital content management system also coordinates sharing and access to the digital document, follow-up actions, and/or other functions based on identifying command indicators and associated command tags within the handwritten content.

To illustrate, in one or more embodiments, the digital content management system identifies, within a digital image, one or more command indicators that cause the digital content management system to share or otherwise manage access to a digital document. For instance, the digital content management system can identify a command indicator associated with a command to provide one or more users access to a resulting digital document based on the digital image. In addition, the digital content management system identifies a command tag corresponding to the access command indicator that includes a name or other identifier of a user or group of users (e.g., a profile name, a user name, a project name, or a group name). In response to identifying the access command indicator and the command tag indicating the identification of a user or group of users, the digital content management system sends an invitation to the user or group users that provides the user or group of users access to the digital document (e.g., an electronic message with a link to the location of the digital document within the digital content management system).

In additional or alternative embodiments, the digital content management system identifies other command indicators and command tags to perform other functions. For instance, the digital content management system can identify a command indicator associated with a command to add a figure (e.g., an image, graph, chart, table, etc.) stored within the digital content management system to the digital document, and an associated command tag that indicates the name and/or location of the figure. Accordingly, based on identifying the command indicator and command tag, the digital content management system retrieves the figure from within the digital content management system, and inserts the figure into the digital document.

The digital content management system can further identify command indicators and command tags to create updatable content portions within a digital document. For instance, the digital content management system identifies a task list command indicator paired with one or more command tags that include a list of tasks, with each task assigned to a user. Accordingly, the digital content management system creates a task list within the digital document, and sends an invitation to access the task list to the users assigned to a task within the task list.

Additionally, as will be described in further detail below, the digital content management system updates the task list. For example, upon receiving a subsequent digital image of handwritten content (e.g., a follow-up photo or scan) showing changes to the handwritten content (e.g., erasures or additions), the digital content management application updates the digital document including the task list to reflect the changes made to the handwritten content. In the case of a task list, the digital content management system updates the task list to indicate which tasks have been completed and/or which user completed the task (e.g., by checking a check box or by deleting the task from the list).

In addition to updating content within a digital document based on a subsequently received digital image, the digital content management system can also merge content from multiple digital images received from one or more users attending the same meeting. In some embodiments, for example, the digital content management system receives two separate images of handwritten content from two separate users, each image including a command indicator to create a document with the same file name (e.g., title). In such a case, the digital content management system creates digital content within the digital document to reflect the handwritten content in the digital images by merging content from the two digital images into a single digital document available to both users.

In addition, the digital content management system enables users to work on a collaborative document. For example, as mentioned above, the digital content management system identifies a command indicator associated with a commend to send an invitation to a user or group of users to access the digital document created from the image of handwritten content. In response, the digital content management system sends the invitation to the user or group of users, thereby granting permission to access the document. In some embodiments, the user or group of users may all be associated with the same collective work project, while in other embodiments the user or group of users may be acquaintances of another type. In this way, the digital content management system creates a collaborative workspace for multiple users to contribute to a single working document. By creating a collaborative digital workspace originating from handwritten content, the digital content management application helps engender more attentive discussions and more effective meetings without the distraction of electronic devices for note taking.

Furthermore, the digital content management system described herein improves computer processing over conventional systems. In particular, the digital content management system more efficiently analyzes an image and more efficiently creates digital content within a digital document corresponding to handwritten content in the image. For example, the digital content management system searches an image for command indicators that are relatively easy to identify instead of aimlessly analyzing each portion of the image in great detail up front. In other words, the digital content management system searches from among a number of pre-known command indicators that are a sort of target when first analyzing an image of handwritten content. In this way, the digital content management system expends less processing power performing an overly-detailed analysis of an image of handwritten content. Thus, by using command indicators, the digital content management system reduces processing time and processing power over conventional systems.

In addition to expending less processing power than conventional systems, the digital content management system described herein also consumes less memory than conventional systems. In particular, in some embodiments, rather than storing many digital documents (e.g., one for each user in a collaborative user group) from multiple images of handwritten content, the digital content management system instead creates a single collaborative digital document by merging multiple images of handwritten content. For example, the digital content management system analyzes images of handwritten content to determine that the images are related (e.g., by way of a command indicator) and rather than creating a digital document for each image, creates a combined digital document to reflect the handwritten content identified within each of the images. Thus, the digital content management system consumes less memory by storing fewer digital documents.

Additional detail will now be provided with regard to the figures. For example, FIG. 1 illustrates a schematic diagram of an example communication environment 100 for implementing a digital content management system 104 in accordance with one or more embodiments. An overview of communication environment 100 is described in relation to FIG. 1. Thereafter, a more detailed description of the components and processes of the video presentation system and other components within communication environment 100 is provided in relation to subsequent figures.

As illustrated in FIG. 1, in one or more embodiments, the communication environment 100 includes server device(s) 102 which host digital content management system 104. The communication environment 100 also includes one or more client devices 107a-107n associated with users 114a-114n. As shown in FIG. 1, client device 107a is associated with user 114a and client device 107n is associated with user 114n. As further shown in FIG. 1, client devices 107a-107n communicate with server device(s) 102 via network 112. In one or more embodiments, client devices 107a-107n may directly communicate with server device(s) 102, bypassing network 112.

As further illustrated in FIG. 1, communication environment 100 includes any potential number of users 114a-114n and therefore includes any number of corresponding client devices 107a-107n. As used herein, the term "user" means an individual, organization, group, or entity that utilizes the digital content management system 104. In some embodiments, a user has a user profile or user account registered the digital content management system 104. For discussion purposes, many of the below features and functions are explained with reference to a single client device (e.g., client device 107a) associated with a single user (e.g., user 114a). It will be understood based on the disclosure herein, however, that this is merely illustrative and that, in various other embodiments, digital content management system 104 may communicate with any number of client devices 107a-107n.

Client devices 107a-107n can be any suitable type of computing device. For example, each of client devices 107a-107n may be a mobile device such as a smartphone, PDA, or tablet. Additionally or alternatively, one or more of client devices 107a-107n may be a non-mobile computing device such as a desktop computer or a laptop computer or any other type of computing device as explained further below with reference to FIG. 9. In addition, client devices 107a-107n can include the same type of functionality to operate within communication environment 100, but need not be the same type of device.

As further illustrated in FIG. 1, client devices 107a-107n can each include a content management application 110. In one or more embodiments, content management application 110 is installed as software, hardware, or a combination of software and hardware on client devices 107a-107n. In still other embodiments, content management application 110 is implemented across communication environment 100, where all or part of the software or hardware associated with content management application 110 is run on the client device (e.g., client device 107a) and/or server device(s) 102.

As mentioned above and as shown in FIG. 1, communication environment 100 includes digital content management system 104. Digital content management system 104 can include any electronic or digital system, or collection of systems, that facilitates electronic communication between two or more computing devices (e.g., between client device 107a and server device(s) 102). For example, digital content management system 104 can include a digital content sharing system, such as, for example, a cloud storage system. In addition, digital content management system 104 can include software and/or hardware associated with server devices 102, client devices 107a-107n, or a combination of server devices 102 and client devices 107a-107n.

As indicated above, digital content management system 104 can communicate with one or more client devices 107a-107n via network 112. Network 112 may include one or more networks and may use one or more communication platforms or technologies suitable for transmitting data and/or communication signals, as described below with reference to FIG. 10. Although FIG. 1 illustrates a particular arrangement of server device(s) 102 and client devices 107-107n, various additional or alternative arrangements are possible.

Generally speaking, communication environment 100 facilitates communication (e.g., data transfer such as a file upload or download) from client devices 107a-107n to server device(s) 102 and vice-versa. Additionally, communication environment 100 facilitates communication between two or more client devices such as, for example, between client device 107a and client device 107b (not shown). For example, user 114a associated with client device 107a can share a digital document with user 114b associated with client device 107b by way of digital content management system 104.

Figure 2A:
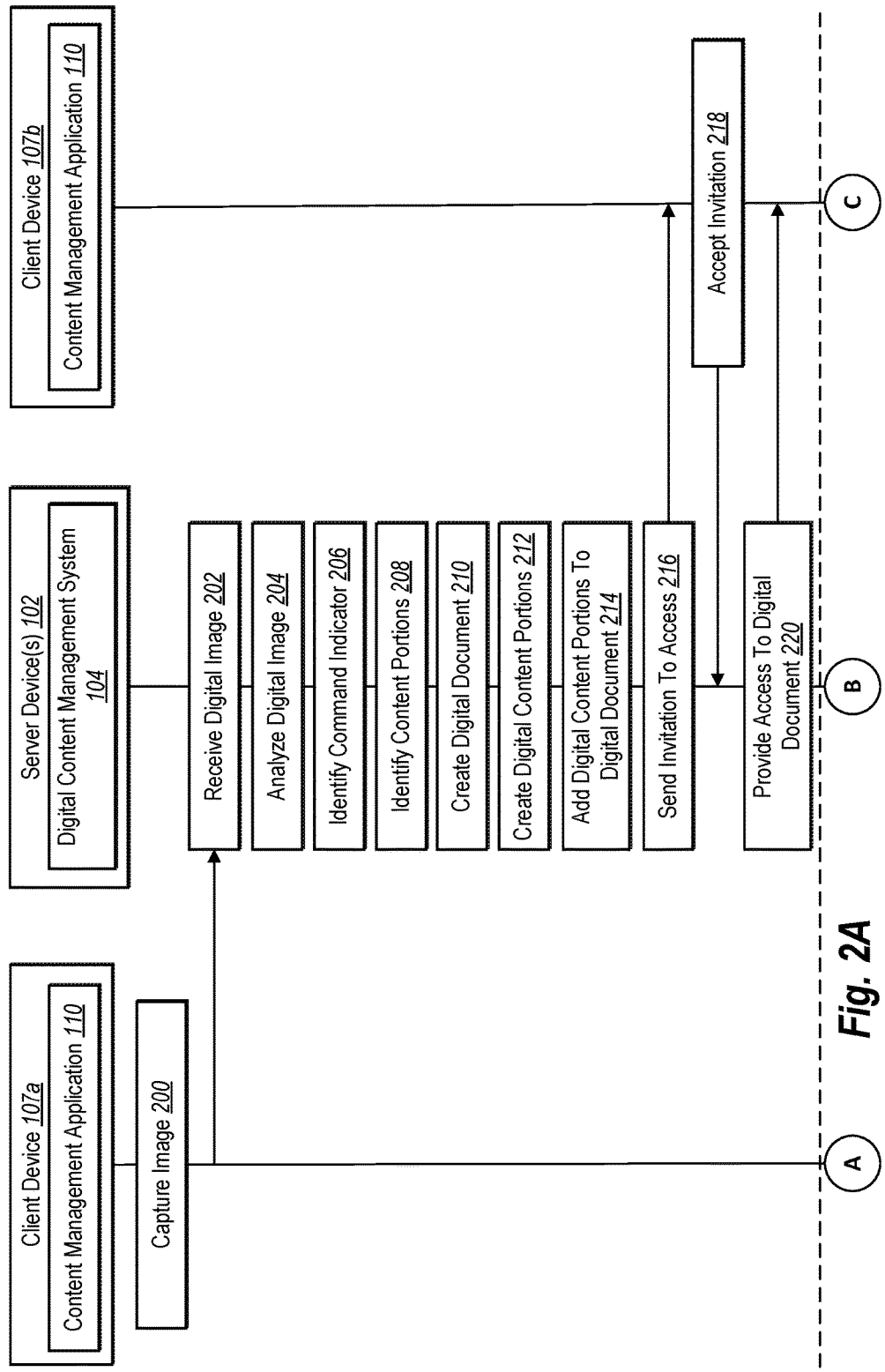
FIGS. 2A-2B illustrate a sequence-flow diagram illustrating interactions between one or more client devices and a digital content management system in accordance with one or more embodiments.
Figure 2B:
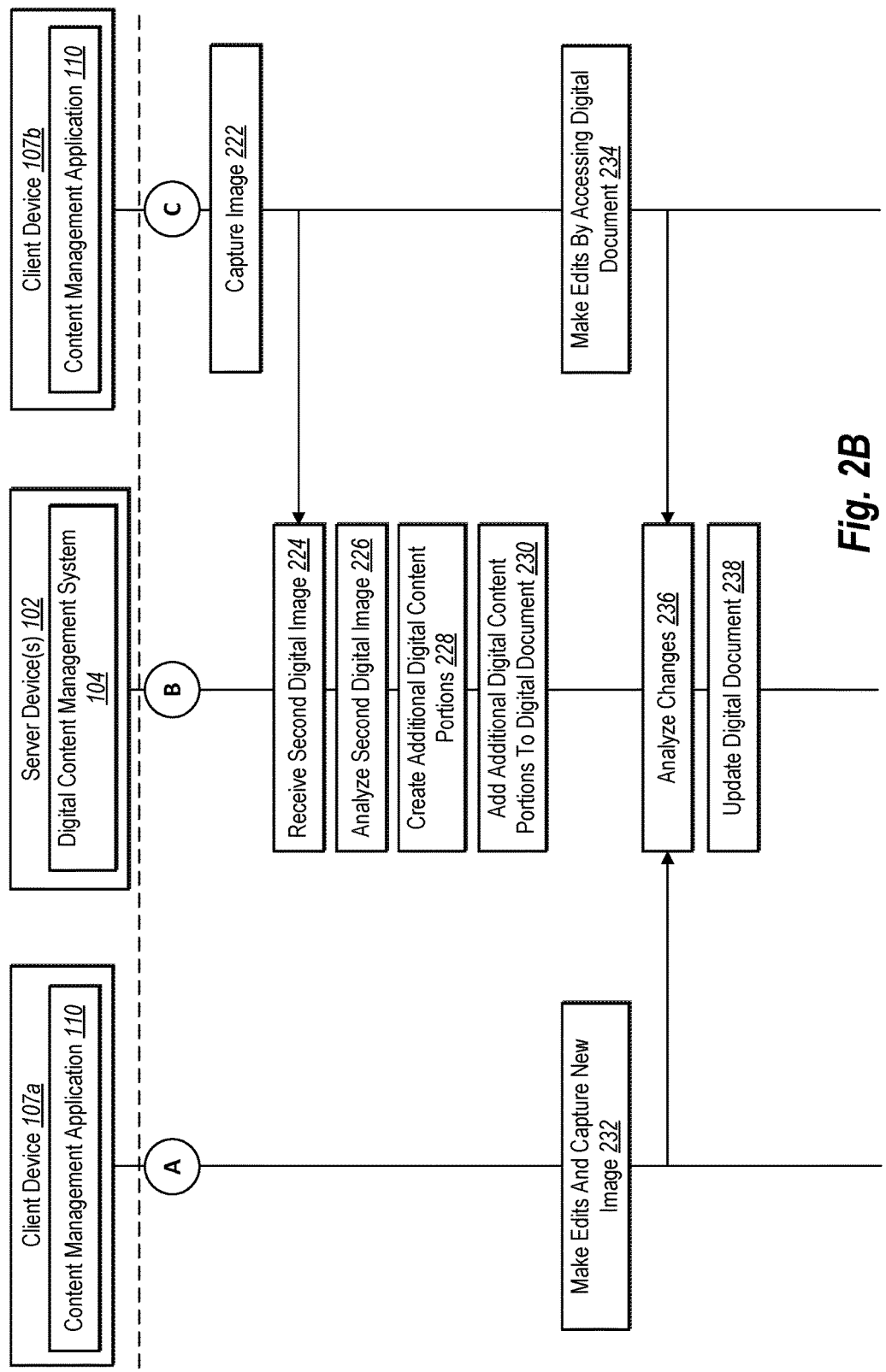

Referring now to FIGS. 2A-2B, a sequence diagram of a digital content management system is shown (e.g., digital content management system 104 of FIG. 1). The sequence includes a number of example acts in an example embodiment of digital content management system 104. Although the acts illustrated in FIGS. 2A-2B are shown in a particular sequence, in one or more additional embodiments, the digital content management system 104 performs the acts in a different sequence. The acts illustrated in FIGS. 2A-2B are performed, respectively, by client devices 107a-107b and server device(s) 102, each executing instructions using one or more processors. As shown, FIG. 2A includes client device 107a and client device 107b, each including content management application 110, and server device(s) 102 including digital content management system 104. The devices, systems, and applications shown in FIG. 2A can refer to the corresponding devices, systems, and applications as discussed above with respect to FIG. 1.

In one or more embodiments, as illustrated in FIG. 2A, digital content management system 104 communicates with content management application 110 on each of client device 107a and client device 107b. For example, as shown in FIG. 2A, the sequence flow diagram depicts act 200 where client device 107a captures a digital image. As used herein, a digital image refers to digital data that provides a visual depiction of a real-world object. For example, a digital image can be a digital photo (from a digital camera), digital scan (from a document scanner), or other digital visual replication data. In one or more embodiments, the visual depiction of a real-world object includes handwritten content, such as a digital photo of a whiteboard showing handwritten notes, or a digital scan of a page of handwritten notes from a notebook. In alternative embodiments, the digital image is a scanned image or photo of notes or other handwritten content written on a piece of paper or other medium. In still other embodiments, the digital image is an image of typewritten content and/or digital figures.

The act 200 of capturing a digital image can include, for example, user 114a accessing an image capturing device (e.g., camera) associated with client device 107a to capture the digital image. In one or more embodiments, the user accesses the image capturing device from within the content management application 110. Alternatively, the user can access the image capturing device using a separate application on the client device 107a (e.g., a native camera application) and then accesses the captured digital image from within the content management application 110.

After capturing the digital image, content management application 110 causes the client device to send (e.g., uploads, communicates, transfers) the captured digital image to digital content management system 104 located on server device(s) 102. For example, in one or more embodiments, user 114a photographs a whiteboard of handwritten notes using client device 107a, and uses content management application 110 to upload the digital photo to a database (e.g., cloud storage) associated with digital content management system 104. Accordingly, and as also shown in FIG. 2A, digital content management system 104 receives the digital image from client device 107a, illustrated in act 202.

In one or more embodiments, digital content management system 104 analyzes the received digital image, as shown by act 204 in FIG. 2A. In particular, digital content management system 104 analyzes the digital image by performing various functions or processes. In particular, digital content management system 104 analyzes the digital image by recognizing characters, figures, charts, symbols, drawings, and other pieces of content within the digital image.

In one or more embodiments, digital content management system 104 performs optical character recognition ("OCR") methods to identify text and other characters within the digital image. It will be understood that, in at least one embodiment, digital content management application 104 analyzes the digital image of handwritten content using OCR techniques to identify handwritten characters and hand drawn figures. Indeed, in at least one embodiment, digital content management system 104 identifies handwritten characters (e.g., letters, numbers, symbols, etc.) depicted within the digital image.

In at least one embodiment, digital content management system 104 analyzes the digital image by differentiating between different types of content. For example, in these embodiments, digital content management system 104 identifies command indicators (act 206) and content portions (act 208). Indeed, as shown by act 206 in FIG. 2A, digital content management system 104 analyzes the digital image to identify command indicators within the handwritten content. As used herein, a "command indicator" refers to a handwritten word, phrase, shape and/or symbol, or a combination thereof, that is associated with a command within digital content management system 104. For example, the symbol of the "+" may be associated with finding or creating a digital document within digital content management system 104.

In particular, based on analyzing the handwritten content within the digital image, digital content management system 104 identifies portions of the digital image that include a command indicator. Digital content management system 104 processes the handwritten content within the digital image according to one or more command indicators, and in addition, the digital content management system 104 may perform additional functions as explained in further detail below with reference to FIG. 3.

In addition to detecting one or more command indicators, and as illustrated in act 208 of FIG. 2A, digital content management system 104 also identifies content portions within the handwritten content of a digital image. As used herein, a "content portion" refers to a discrete part of a digital image corresponding to a type of content. For example, a content portion can include a text portion (e.g., a body of text, a line of text, a word, or any other denomination of an amount of text). Additionally, a content portion can include a figure portion (e.g., an image, a graph, a table, a spreadsheet, etc.). Indeed, and as will be explained further below, based on identifying one or more content portions, such as a text portion and/or a figure portion, digital content management system 104 differentiates and processes each content portion based on the type of content portion (e.g., digital content management system 104 processes a text portion different from a figure portion).

In one or more embodiments, and as part of identifying content portions (act 208), digital content management system 104 further identifies various attributes and/or characteristics of the handwritten content within the digital image. In at least one embodiment, digital content management system 104 identifies an arrangement of content portions. As used herein, "arrangement" refers to a location and/or position of a content portion relative to one or more additional content portions. For example, as part of identifying an arrangement, digital content management system 104 identifies blank space between content portions within the digital image. In this way, digital content management system 104 identifies an arrangement of any identified content portions (e.g., location of content portions within the digital image relative to other content portions) to use in arranging content portions from a digital image within a digital document.

Additionally, digital content management system 104 identifies handwritten content attributes (e.g., format characteristics) such as font style. As used herein, "format characteristics" can include font styles or aesthetics such as underlining, italics, bold, all caps, or even font types such as cursive or block letters. Format characteristics can also refer to margins, spacing, color, design, texture, or other visual attributes of handwritten text or handdrawn figures. Digital content management system 104 identifies such format characteristics of the handwritten content within the digital image to create digital content portions within a digital document to correspond to the handwritten content, as described in further detail below. That is to say, digital content management system 104 creates digital content within a digital document to reflect or resemble the look and/or layout of the handwritten content within the digital image, as described hereafter with reference to acts 210 and 212 of FIG. 2A.

In identifying format characteristics, in some embodiments, digital content management system 104 identifies format characteristics of one or more portions of handwritten content that indicate specialized content. For example, in some embodiments, digital content management system 104 analyzes the handwritten content within the digital image to recognize specialized text such as computer code, hyperlinks, task lists, etc. In at least one embodiment, digital content management system 104 creates digital content portions within a digital document to correspond to identified specialized text portions.

Further illustrated in FIG. 2A, act 210 illustrates that digital content management system 104 creates a digital document. As used herein, the term "digital document" refers to digital data that defines a viewable, editable, shareable electronic file. For example, a digital document can include data representing text, figures, images, graphs, and/or other digital data. In one or more embodiments, a digital document refers to a word processing document, a spreadsheet document, a slide presentation document, other types of digital documents.

As mentioned above, in response to identifying a command indicator (act 206) associated with a command to create a new digital document, digital content management system 104 creates a new digital document. In particular, digital content management system 104 creates a digital document in preparation for adding digital content portions to the digital document that correspond to the identified content portions of the handwritten content depicted within the digital image.

In other examples, digital content management system 104 identifies a command indicator (act 206) associated with a command to search for a previously created digital document within a database of digital content management system 104. In addition, digital content management application 104 identifies a command tag including a file name used in conjunction with the command indicator. The command tag (e.g., file name) indicates the name of the digital document (e.g., file name) for which the digital content management system 104 searches.

In some embodiments, the command indicator associated with the command to search for a digital document may be a different symbol than the command indicator associated with the command to create a new digital document. In other embodiments, the command indicator to create a new digital document and the command indicator to search for a digital document may be the same symbol. In other words, in some embodiments, upon failing to return a search result after searching for a digital document, digital content management system 104 creates a new digital document and names the digital document with the name indicated in the command tag.

Continuing with FIG. 2A, and as shown in act 212, digital content management system 104 creates digital content portions within the digital document created in act 210. In particular, digital content management system 104 creates digital content portions that correspond to the handwritten content within the digital image. For example, in at least one embodiment, digital content management system 104 identifies a text portion and a figure portion within the digital image of handwritten content. Accordingly, digital content management system 104 creates a digital text portion including digital text that corresponds to the text portion within the handwritten content of the digital image. Additionally, digital content management system 104 creates a digital figure portion corresponding to the figure portion identified within the handwritten content of the digital image.

Next, and as shown by act 214 of FIG. 2A, digital content management system 104 adds the digital content portions to the digital document. In particular, digital content management system 104 arranges and formats the digital content portions within the digital document in accordance with identified arrangement and format characteristics, as discussed above with respect to act 208 of identifying content portions within handwritten content. For example, digital content management system arranges the digital content portions (e.g., by generating margins and spacing) as well as formats the digital content portions (e.g., by determining and applying size characteristics, font styles, and/or other formatting characteristics as discussed above.

Digital content management system 104 creates a digital content portion (act 212) and adds the created digital content portion to the digital document (act 214) for each identified content portion within handwritten content of the digital image. Other examples of creating and adding a digital content portion to the digital document include digital content management system 104 identifying a portion of text within the digital image as computer code. In response, digital content management system 104 creates a digital text portion within the corresponding digital document highlighting portions of the text, indenting portions of the text, and organizing the text like a computer programming environment. As another example, digital content management system 104 identifies a hyperlink portion (208) within the handwritten content and creates a digital hyperlink (act 212) to add to the digital document (act 214). Digital content management system 104 links the hyperlink to the address indicated within the identified handwritten text and formats the hyperlink to look like (e.g., share visual attributes with) a hyperlink on a website (e.g., blue font and underlined).

Furthermore, in creating and adding digital content portions, digital content management system 104 creates a digital figure corresponding to handdrawn figures identified within the digital image. Depending on a type of figure, for example, digital content management system 104 inserts a digital image or table portion corresponding to an identified handdrawn image or a table portion within the digital image of handwritten content. As another example, digital content management system 104 creates a spreadsheet, including individual cells and function capabilities (e.g., equation solving, graphing, formula functions) of a standard digital spreadsheet in response to identifying a handdrawn spreadsheet within the digital image. The digital content management system 104 creates an individual digital figure portion to correspond to each identified handdrawn figure portion within the digital image.

Accordingly, and as illustrated by act 214 of FIG. 2A, digital content management system 104 creates and adds editable and manipulable digital content portions within a digital document from a digital image depicting handwritten content. Each handdrawn figure within the digital image has a corresponding manipulable digital figure in the digital document. In addition, digital content management system 104 incorporates each digital figure or other digital content portion (e.g., text body) into the digital document as an individual entity within the whole digital document. As such, digital content management system 104 enables a user to edit and/or otherwise manipulate (e.g., relocate, move, rotate, resize, adjust, etc.) each digital content portion on an individual basis.

Still referring to FIG. 2A, digital content management system 104 sends an invitation to access the digital document to user 114b by way of client device 107b. It will be appreciated that digital content management system 104 sends the invitation to access the digital document in response to identifying a command indicator (206) associated with a command to send the invitation. To illustrate, digital content management system 104 identifies a first command indicator associated with a command to search for or create a digital document, as described above. Furthermore, digital content management system 104 identifies a second command indicator associated with a command to send an invitation to access the digital document to client device 107b. Accordingly, digital content management system 104 executes the relevant commands by searching for and/or creating a digital document and sending an invitation to access the digital document to client device 107b.

Although FIG. 2A depicts digital content management system 104 sending an invitation to a single client device (e.g., client device 107b), it will be appreciated that digital content management system 104 may send an invitation to access the digital document to any number of client devices.

As shown by act 220, it will also be understood that, once the user (e.g., user 114b) accepts the invitation, digital content management system 104 provides access to the digital document to user 114b associated with user device 107b. In other words, digital content management 104 grants permission to a user (e.g., user 114b) associated with a user profile to access the digital document in accordance with the permission settings set by digital content management system 104 and/or the user who captured the digital image (e.g., user 114a).

For example, as shown in act 218 of FIG. 2A, user 114b accepts the invitation to access the digital document by way of client device 107b. Upon detecting that user 114b has accepted the invitation via client device 107b, digital content management system 104 enables a user associated with a particular user profile or a particular client device (e.g., client device 107b) to access the digital document, shown in act 220.

Continuing the sequence flow diagram from FIG. 2A to FIG. 2B, act 222 illustrates that client device 107b captures a digital image to send to digital content management system 104. For example, in some cases, digital content management system 104 receives more than one digital image of handwritten content for a single event (e.g., notes from two different users that attend the same meeting). For example, as shown in FIG. 2B, client device 107b captures a second digital image (act 222), and digital content management system 104 receives the second digital image, illustrated by act 224.

Similar to act 204 described above where digital content management system 104 analyzes a first digital image received from client device 107a, digital content management system 104 also analyzes a second digital image of handwritten content received from client device 107b. In particular, as described above with relation to the first digital image, digital content management system 104 identifies individual content portions within handwritten content depicted within the second digital image. For example, digital content management system 104 identifies handwritten text portions and/or handdrawn figure portions (e.g., pictures, graphs, spreadsheets, etc.). In addition, and as described above, digital content management system 104 parses the identified handwritten text using OCR techniques. In this way, digital content management system recognizes handwritten text characters within the digital image and thereby converts the handwritten text into digital text by creating corresponding digital text portions to insert within the digital document.

In at least one embodiment, digital content management system 104 identifies a command indicator within the second digital image associated with a command to combine the handwritten contents therein with the handwritten contents identified within the first digital image. For example, the command indicator can include a command tag that references the first digital document (e.g., a file name). In response, digital content management system 104 merges the identified content portions of the second digital image (e.g., the digital image received from client device 107b) into the digital document created in act 210.

In at least one other embodiment, digital content management system 104 identifies a command indicator associated with a command to create a new document, apart from the first digital document associated with the first digital image. In response, digital content management system 104 creates a new digital document to correspond to the second digital image. In these or other embodiments, digital content management system 104 treats the first digital document created from the first digital image independently from the second digital document created from the second digital image.

As mentioned, FIG. 2B illustrates the example where, based on identifying a command indicator to add content to the previously created digital document, digital content management system 104 proceeds to process the second digital image to eventually combine content of the second digital image into a single digital document that includes content from both the first and second digital image. Accordingly, digital content management system 104 creates additional digital content portions for the identified handwritten content of the second digital image, as shown in act 228 of FIG. 2B. As described above in act 212 regarding the first digital image, digital content management system 104 creates digital text portions for identified text portions within handwritten content of the second digital image, and further creates digital figure portions for identified figure portions within the handwritten content of the second digital image.

Digital content management system 104 further adds the additional digital content portions to the digital document, as shown in act 230 of FIG. 2B. In particular, digital content management system 104 arranges the additional digital content portions (e.g., digital text portions and digital figure portions) within the digital document in accordance with arrangement and format characteristics of the handwritten content identified in the digital image. For example, digital content management system 104 merges the additional content portions created from the second digital image into the digital document created based on the first digital image.

In one or more embodiments, for example, digital content management system 104 analyzes format characteristics of the handwritten content such as, for example, the layout of the handwritten content of each digital image to find the best location for each digital content portion. For example, digital content management system analyzes the first digital image and the second digital image to identify differences between the two images. In some examples, for instance, the first digital image and the second digital image may have matching (e.g., partially matching or completely matching) or similar handwritten content. That is to say, in these examples, the originator of the handwritten content within the first digital image (e.g., user 114a) and the originator of the handwritten content within the second digital image (e.g., user 114b) may have written a list of content with some items that are the same in each list, and/or may have drawn figures that are similar in appearance and that are meant to illustrate the same thing or parts of the same thing.

To determine whether two digital images contain matching or similar handwritten content, digital content management system 104 analyzes the handwritten content to determine a similarity score (e.g., a percentage of content that is shared between the two digital images). For example, in one embodiment, the digital content management system 104 determines a "match" of portions of handwritten content shared between two digital images if the digital content management system 104 determines that the handwritten content is above a match threshold (e.g., 95 percent match or greater).

To determine whether portions of handwritten content from separate digital images meet or exceed a match threshold, the digital content management system 104 analyzes the handwritten content of each digital image. Generally, when two people each write handwritten content using two separate handwriting styles, the appearance of the handwritten content within the two respective digital images will differ. Accordingly, the digital content management system 104 analyzes the handwritten content of each digital image to determine corresponding digital content portions for each portion of handwritten content. For example, for two digital images each containing the letter "A" written in two different handwriting styles, the digital content management system 104 nonetheless identifies each handwritten "A" as an "A."

Additionally, the digital content management system 104 compares the handwritten content of each digital image to determine a similarity score. In particular, the digital content management system 104 discretizes the handwritten content into measurable increments to compare like quantities between digital images. For example, the digital content management system 104 divides the handwritten content of each digital image into individual words, pictures, figures, graphs, or other pieces of content. As another example, the digital content management system 104 divides the handwritten content of each digital image larger or smaller "chunks" such as letters and/or sentences.

By comparing these discrete "chunks" of handwritten content, the digital content management system 104 determines an amount (e.g., a percent) of the handwritten content that is shared between the digital images. For example, the digital content management system 104 compares the digital content equivalent of each portion of handwritten content (the digital "A" the corresponds to each style of handwritten "A" within the digital images) to determine whether the similarity score of the handwritten content exceeds a match threshold (e.g., 95%). In such a case, digital content management system 104 merges the handwritten content of each digital image by adding the additional digital content portions of the second digital image to the digital document (act 230) that are not already included in the digital document from the first digital image. To illustrate, digital content management system 104 adds only those additional digital content portions to the digital document that are different from the digital content portions previously added to the digital document from the first digital image, thereby avoiding duplicate digital content portions. In other embodiments, however, digital content management system 104 adds each additional digital content portion from the second digital image, regardless of whether there are duplicates.

In at least one embodiment, the digital content management system 104 further presents, to each user (e.g., user 114a and user 114b) associated with each digital image to be merged, an option to accept the merger. Upon receiving an acceptance (e.g., as indicated by a user selection of an option to accept) from one user (e.g., an administrator user) or else from more than one user (e.g., each user involved in the merger), the digital content management system 104 combines the handwritten content of each digital image into a single digital document.

In addition, in at least one embodiment, digital content management system 104 updates, in response to receiving a new digital image (e.g., from user 114a), the digital document with modifications to handwritten content (e.g., modifying handwritten content on a whiteboard). For example, upon receiving a new digital image of modified handwritten content captured by user 114a, as shown by act 232 of FIG. 2B, digital content management system 104 modifies the digital document accordingly to reflect the handwritten content in the new digital image. In particular, digital content management system 104 receives a new digital image including new handwritten content and/or including deletions (e.g., erasures) of handwritten content. Digital content management system 104 receives the new digital image in the same way as described above with respect to the first digital image and/or the second digital image, and digital content management system 104 further creates and/ or removes digital content portions in accordance with added or deleted handwritten content identified in the new digital image.

In the same or other embodiments, digital content management system 104 edits the digital content of the digital document, as shown by act 234 of FIG. 2B in response to receiving user input to edit the digital content. In particular, the digital content management system 104 adds, removes, or changes content within a digital document in response to receiving digital input from a user (e.g., user 114a) by way of, for example, a user interface for editing the digital document. For example, the digital content management system 104 receives user input by way of a keyboard, touchscreen, mouse, or other input interface associated with a computing device.

Additionally, the digital content management system 104 receives user input to edit digital content within a digital document. Accordingly, the digital content portions created within a digital document are fully editable and manipulable using a computing device. For example, a digital text portion created by way of OCR techniques includes individual characters that are searchable and edible by way of a text editing application. Also, a digital figure such as an image is moveable, resizable, and otherwise manipulable by an image editing application. As a further example, a digital figure such as a spreadsheet (e.g., created in response to an identified handdrawn table or chart within the digital image) includes individual cells manipulable as described above.

In any event, as shown in act 236, digital content management system 104 analyzes the changes made to the content. For example, in embodiments where digital content management system 104 receives a new digital image from client device 107a including changes (e.g., additions, deletions, or other alterations) to the handwritten content previously received in the first digital document from client device 107a, digital content management system 104 analyzes the new digital image to create digital content portions corresponding to identified handwritten content therein.

Additionally, the digital content management system 104 compares the digital content portions created from the handwritten content of the new digital image with the digital content portions already added to the digital document. In this way, digital content management system 104 identifies differences between the existing digital content portions of the digital document and the new digital content portions that correspond to the handwritten content within the new digital document. For example, digital content management system 104 identifies changes made to a list of items where user 114a deleted one item from the list, altered another item within the list, and added a new item to the list. Based on identifying the discrepancies between the digital document and the new digital image (e.g., including the changes), digital content management system 104 updates the digital document accordingly, as shown in act 238.

As mentioned, in response to identifying content differences (e.g., either by analyzing a new digital image including changes to the handwritten content or by receiving changes directly to the digital content by way of content management application 110), digital content management system 104 updates the digital document, as shown in act 238 of FIG. 2B. In particular, digital content management system 104 updates the digital content within the digital document to reflect the changes made to the handwritten content based on a new image and/or changes made directly to the digital content within the digital document. For example, digital content management system 104 adds new items to a list, deletes removed items from the list, and/or changes existing items within the list according to identifying corresponding changes to the handwritten content within the new digital image received from user device 107a. Additionally or alternatively, digital content management system 104 applies format characteristics according to identified format changes within the handwritten content and/or in response to a command associated with an identified command indicator to change the format in a specified manner.

With respect to the above discussion regarding FIGS. 2A-2B, it will be understood based on the disclosure herein that, in at least one embodiment, digital content management system 104 performs one or more of the acts (e.g., act 200-238) illustrated throughout FIGS. 2A-2B in response to identifying a command indicator associated with a particular command within handwritten content of a digital image. In at least one other embodiment, digital content management system 104 performs one or more of the acts in response to user prompts (e.g., user interaction via content management application 110) and/or identifying content changes without user interaction.

Figure 3:
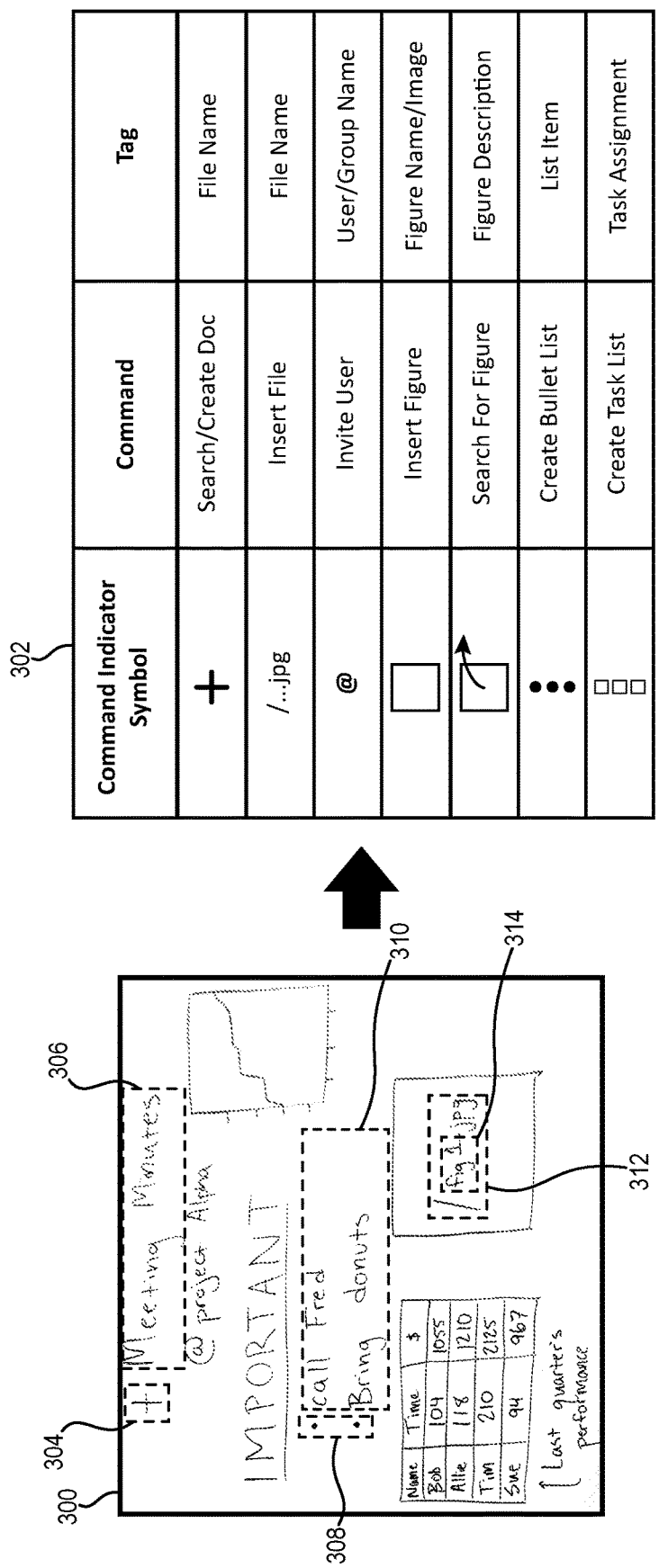
FIG. 3 illustrates an example digital image of handwritten content and an example command indicator lookup table in accordance with one or more embodiments.

For example, FIG. 3 illustrates first digital image 300 including various handwritten content and command indicators. Additionally, FIG. 3 shows command indicator lookup table 302. In particular, first digital image 300 includes at least command indicators 304, 308, and 312. As discussed above, command indicators 304, 308, and 312 are associated with particular commands. As further shown in FIG. 3, first digital image 300 includes command tags 306, 310, and 314. Command tags 306, 310, and 314 accompany command indicators 304, 308, and 312, respectively. Each of command tags 306, 310, and 314 include information that accompanies command indicators 304, 308, and 312.

Generally, upon identifying command indicators 304, 308, and/or 312, and the corresponding command tags 306, 310, and 314, digital content management system 104 performs the commands associated with each respective command indicator 304, 308, and/or 312 in accordance with the information included in the command tags 306, 210, and 314. For example, in response to identifying a command indicator (e.g., command indicator 304), digital content management system 104 performs a lookup operation to determine a command.

In particular, and as FIG. 3 illustrates, command indicator lookup table 302 includes a "Command Indicator Symbol" column, which outlines a number of example command indicator symbols. Command indicator lookup table 302 also includes a "Command" column and a "Tag" column that describe the respective digital content management system command and the command tag, respectively, that are associated with each command indicator symbol depicted under the "Command Indicator Symbol" column.

For example, as illustrated in FIG. 3, command indicator 304 is represented by the "+" symbol drawn in first digital image 300 and likewise represented in command indicator lookup table 302. It will be understood, however, that command indicator 304 may be represented by a different symbol, character, or image. The same is true for command indicators 308 and 312. In general, the command indicators illustrated in FIGS. 3-6 are examples. In one or more embodiments, digital content management system 104 provides different symbols associated with the commands listed in the lookup table 302. Moreover, in other embodiments, the digital content management system 104 allows a user to define custom command indicators to correspond to particular commands.

As further shown by command indicator lookup table 302, a command indicator (e.g., command indicator 304) is associated with a command to search for or create a new digital document. Additionally, a command indicator is further associated with a command tag that represents the file name of the digital document that digital content management system 104 searches for or creates in response to identifying command indicator 304. In some cases, a command indicator symbol within command indicator lookup table 302 is associated with a corresponding command and command tag.

As described above, in one or more embodiments, in response to identifying a command indicator, digital content management system 104 looks up the command (e.g., within command indicator lookup table 302) associated with the command indicator and performs the given command. Additionally, digital content management system 104 identifies a command tag (e.g., command tag 306) used in conjunction with a given command indicator (e.g., command indicator 304), thereby identifying additional information used in carrying out the given command. Once digital content management system 104 identifies the proper command associated with the given command indicator (e.g., a command to search for or create a new digital document) as well as the proper information represented by the corresponding command tag (e.g., command tag 306 that represents a file name), then digital content management system 104 executes the respective command.

For example, as illustrated in FIG. 3, command indicator 304 corresponds with a command (as indicated in lookup table 302) to search for or create a new document, and the command indicator 304 is further associated with a command tag 306 that includes a file name. Accordingly, in response to identifying command indicator 304, the digital content management system 104 looks up the command "Search/Create Doc" and determines that the command tag 306 includes a "File Name" as indicated in lookup table 302. The digital content management system 104 executes the given command ("Search/Create Doc") to search for or create a digital document with a file name corresponding to command tag 306 ("Meeting Minutes").

In particular, in response to identifying command indicator 304 and command tag 306 digital content management system 104 searches for a digital document within a database maintained by digital content management system 104. To illustrate, digital content management system 104 searches the database for a digital document with a file name (e.g., document name, title, etc.) that matches command tag 306 ("Meeting Minutes").

In the event digital content management system 104 locates a digital document with a file name that matches (e.g., partially matches, likely matches, or completely matches) command tag 306, digital content management system 104 uses the digital document to add digital content portions based on the first digital image 300 and performs one or more additional commands with respect to the located digital document. Alternatively, in the event digital content management system 104 fails to locate a digital document within a database with a file name that is the same as command tag 306, digital content management system 104 creates a new digital document with a file name that matches command tag 306. In such a case, and as explained in more detail below with reference to FIG. 4, digital content management system 104 adds digital content portions based on the first digital image 300 and performs one or more additional commands with respect to the created digital document.

First digital image 300 includes other example command indicators. As another example, command indicator 308 corresponds with command tag 310. With reference to command indicator lookup table 302, based on identifying command indicator 308, digital content management system 104 creates a bulleted list where each item in the list is given by command tag 310, such as "call Fred" and "Bring donuts."

As an additional example, first digital image 300 includes command indicator 312 corresponds with command tag 314. In particular, command indicator 312 is associated with a command to insert a file with a particular file name (e.g., file path), given by command tag 314. As such, upon identifying command indicator 312 and command tag 314, digital content management system 104 searches, retrieves, and inserts a file (e.g., an image, a song, a video, a link, etc.) with file name "fig1.jpg" into a location within the digital document corresponding to the location of command indicator 312 and command tag 314 within first digital image 300.

Command indicator lookup table 302 includes additional or alternative command indicators. For example, command indicator lookup table 302 depicts a command indicator, "@," associated with a command to invite a user or group of users to have access to the digital document. The corresponding command tag (e.g., "project Alpha") shown in first digital image 300 is a name for a work project, which is associated with a group of user identifications. Upon identifying the command indicator "@" and the command tag "project Alpha," digital content management system 104 sends an invitation to permit access to the digital document each user associated with project Alpha.

In particular, in one or more embodiments, digital content management system 104 grants access to each user within project Alpha according to permission settings associated with each user profile as set by an administrator, the digital document originator (e.g., user 114*a*) and/or digital content management system 104. For example, some users within project Alpha may be granted read-only permissions while other users may be granted full access to edit and manipulate content within the digital document, according to a determined level of involvement with project Alpha.

Command indicator lookup table 302 includes other examples of command indicator symbols associated with commands instructing digital content management system 104 to insert a figure, search for a figure, and create a task list. It will be appreciated that command indicator lookup table 302 is exemplary and does not represent every possible command indicator, command tag, and associated command. In particular, in one or more embodiments, digital content management system 104 may look up commands associated with various command indicators that include a smaller or larger number than those indicated in FIG. 3.

In some embodiments, digital content management system 104 manages a calendar (e.g., via calendar application) by adding and removing calendar events in accordance with identified command indicators and content portions within one or more digital images of handwritten content (e.g., first digital image 300), as described above.

For example, the digital content management system communicates with a third-party calendar application (e.g., via an API) to perform various functions. Particularly, the digital content management system 104 communicates with a calendar application to transmit calendar events identified by way of command indicators and/or command tags as discussed with relation to FIG. 3. To illustrate, the digital content management system 104 identifies a command indicator corresponding to a command to create a calendar event and communicates with a third-party calendar application to create a calendar event within a pre-existing digital calendar associated with the user (e.g., user 114*a*). Additionally, the digital content management system 104 communicates with a third-party calendar application to transmit a corresponding command tag that indicates a name (e.g., title) of the respective calendar event to add to the user's digital calendar.

Similarly, the digital content management system 104 communicates with other third-party applications. In particular, the digital content management system 104 communicates with third-party applications to perform various functions corresponding to one or more command indicators. For example, the digital content management system 104 identifies a command indicator corresponding to a command associated with a third-party application. For instance, the digital content management system 104 identifies a command indicator associated with a command of a project management application, a email application, a word processing application, or other third-party application. Accordingly, the digital content management system 104 facilitates the third-party application to execute the command that corresponds to a command indicator in response to identifying the command indicator.

To facilitate third-party applications, the digital content management system 104 interfaces (e.g., via an API) with one or more third-party applications. In particular, the digital content management system 104 receives an indication from a third-party application of a symbol or character that corresponds to one or more commands of the third-party application. Additionally, the digital content management system 104 receives an indication from the third-party application of the commands that correspond to given command indicators. In this way, the digital content management system 104 provides, to the third-party application in response to identifying a command indicator, an indication of a command for the third-party application to perform as well as any information needed to perform the application. Accordingly, the third-party application executes or otherwise performs the command corresponding to the identified command indicator.

As another example, digital content management system 104 adds and/or removes comments from within a digital document. In particular, though not shown in table 302 of FIG. 3, digital content management system 104 identifies a command indicator associated with a command to add a comment in a margin (or elsewhere) within digital document 400, and further adds the comment using identified text (e.g., a command tag) from within the digital image, in accordance with the systems and methods described above.

In additional or alternative examples, digital content management system 104 receives and analyzes recorded audio to identify auditory command indicators, command tags, and content portions. In these examples, digital content management system 104 creates and adds corresponding digital content portions to a digital document (e.g., digital document 400) in accordance with the systems and methods described above.

Figure 4:
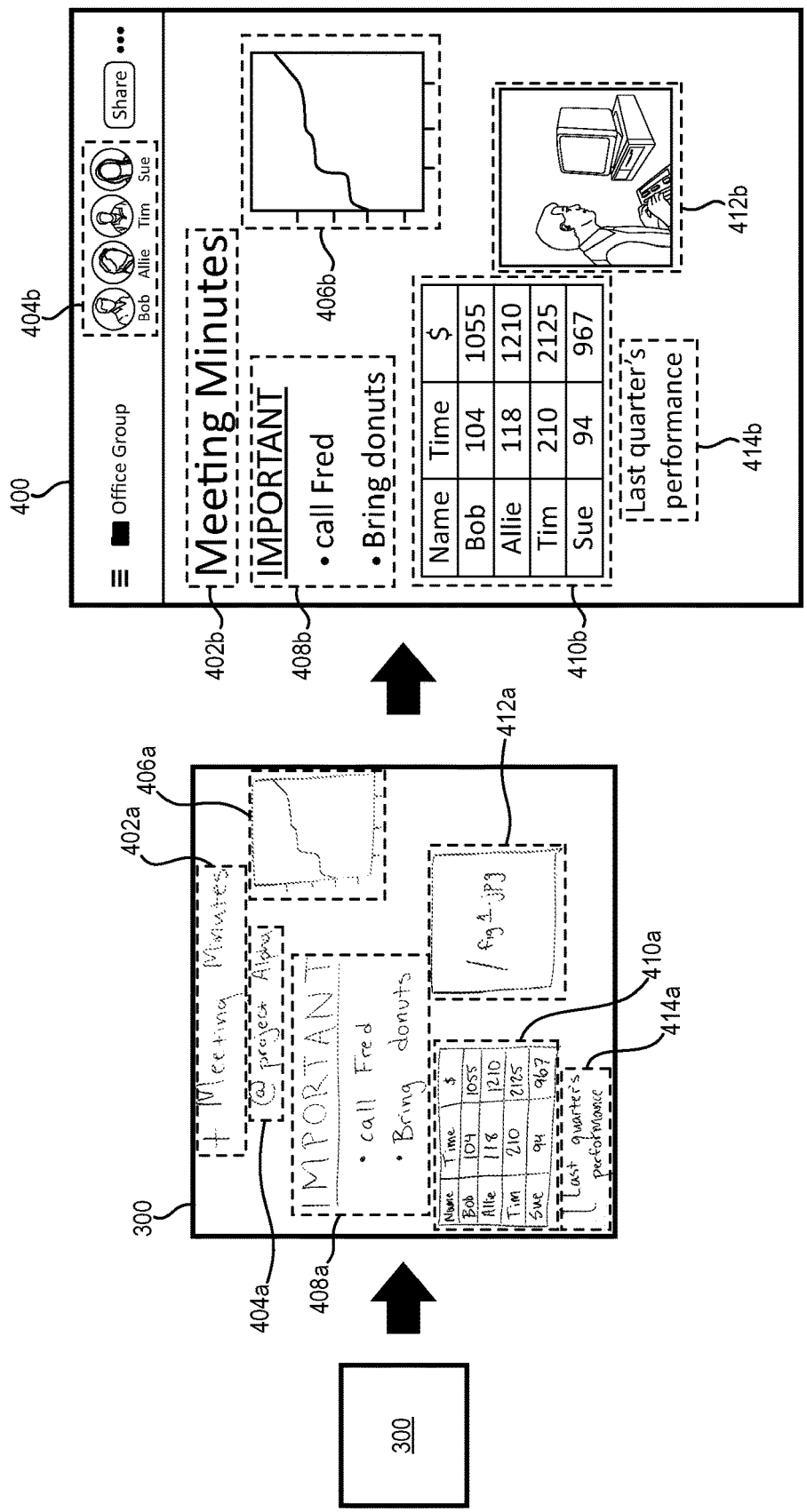
FIG. 4 illustrates an example digital document including digital content portions corresponding to handwritten content in accordance with one or more embodiments.

Referring now to FIG. 4, a schematic representation of a process of converting first digital image 300 into digital document 400 is shown. In particular, digital content management system 104 analyzes first digital image 300 as described above to identify content portions in addition to command indicators and command tags. In FIG. 4, first digital image 300 is shown first as a representative icon and also as a representation of a detailed analysis that digital content management system 104 performs to identify each individual content portion therein. Further shown in FIG. 4, digital content management system creates digital document 400 and adds to it the digital content portions that correspond to the content portions identified within handwritten content of first digital image 300.

As mentioned, digital content management system 104 receives first digital image 300 and analyzes first digital image 300 to identify handwritten content therein. In particular, digital content management system 104 analyzes first digital image 300 to identify handwritten content 402a-414a. Based on identifying each of handwritten content 402a-414a, digital content management system creates digital content portions 402b-414b. Digital content management system 104 places digital content portions 402b-414b within digital document 400 in accordance with identified format characteristics identified within first digital image 300 (e.g., location, font style, font size, placement, spacing, etc.), as shown in FIG. 4. Digital content portions 402b-414b are digital versions of handwritten content 402a-414a, including the corresponding text, numbers, figures, and characters. For example, digital content portion 402b is the title "Meeting Minutes" within digital document 400 and corresponds to handwritten content portion 402a, which is the title "Meeting Minutes" shown within first digital image 300.

In at least one embodiment, digital content management system 104 identifies one or more content portions within first digital image 300 as both a content portion and a command indicator. For example, handwritten content portion 402a includes command indicator 304 and command tag 306 illustrated in FIG. 3. In these embodiments, digital content management system 104 treats handwritten content portion 402 as both a content portion and a command indicator with accompanying command tag. In other words, digital content management system 104 executes the command associated with command indicator 304 and also creates digital content portion 402b within digital document 400. The same is true for other handwritten content (e.g., handwritten content 404a, 408a, and 412a) that also include command indicators and/or command tags. That is to say, digital content management system 104 identifies command indicators and command tags, looks up the associated command, executes the given command, identifies handwritten content, creates corresponding digital content portions, and adds the created digital content portions to digital document 400, all in response to analyzing the same group of characters within first digital image 300.

Shown in FIG. 4, digital content management system 104 identifies handwritten content portion 404a. As mentioned, some portions of handwritten content also contain command indicators and/or command tags. For example, digital content management system 104 identifies handwritten content portion 404a that includes a command indicator and command tag as shown in command indicator lookup table 302. Furthermore, digital content management system 104 creates digital content portion 404b to correspond to handwritten content portion 404a. In some embodiments, as shown in FIG. 4, digital content portion 404b does not have a similar visual appearance to handwritten content portion 404a.

Instead, digital content management system 104 identifies certain handwritten content (e.g., handwritten content portion 404a) as corresponding to certain functionalities of a digital document (e.g., digital document 400). For example, handwritten content portion 404a is meant to instruct digital content management system 104 to make digital document 400 available to all users associated with "project Alpha." Therefore, digital content management system 104 creates digital content portion 404b to be more functional and consistent with features of digital documents within digital content management system 104. As such, and as shown in FIG. 4, digital content management system adds digital content portion 404b as a user profile bar (e.g., including profile images) indicating each user of project Alpha who has been given access to digital document 400.

As illustrated in FIG. 4, digital content management system 104 identifies handwritten content portion 406a. As illustrated, handwritten content portion 406a is a line graph with a handdrawn upward trajectory. In response to identifying handwritten content portion 406a within first digital image 300, digital content management system 104 creates digital content portion 406b. In detail, digital content management system 104 analyzes handwritten content portion 406a to determine that handwritten content portion 406a is a line graph with an upward trajectory. Digital content management system 104 creates digital content portion 406b, including digital a line graph with a digitized line having an upward trajectory to match that identified in handwritten content portion 406a.

As further illustrated in FIG. 4, digital content management system 104 identifies handwritten content portion 408a, including all format characteristics associated thereto. For example, handwritten content portion 408a includes a header, "IMPORTANT," in all caps and underlined, located in the vertical upper-middle of first digital image 300 and near the left side of first digital image 300. Additionally, beneath the header "IMPORTANT," handwritten content portion 408a includes a bulleted list of two items, "call Fred" and "Bring donuts." Accordingly, digital content management system 104 creates digital content portion 408b, including a header "IMPORTANT," also in all caps and underlined and in a font similar to handwriting of handwritten content portion 408a.

Digital content management system also creates two bullet points (e.g., "call Fred" and "Bring donuts") in a bulleted list beneath the header as part of digital content portion 408b. Digital content management system 104 applies format characteristics identified for handwritten content portion 408a when adding digital content portion 408b to digital document 400. To illustrate, as shown in FIG. 4, digital content management system 104 adds digital content portion 408b in the vertical upper-middle and near the left side of digital document 400. Additionally, digital content management system 104 applies font characteristics identified from handwritten content portion 408a to digital content portion 408b, such as using a similar-looking font style, capitalizing letters written in capital letters, and underlining letters that are underlined in first digital image 300.

Still further illustrate in FIG. 4, digital content management system 104 identifies handwritten content portion 410a. As shown in FIG. 4, handwritten content portion 410a is a handdrawn table including names and numbers depicting various data. In response to identifying handwritten content portion 410a, digital content management system 104 creates digital content portion 410b, including the same names and numbers. Importantly, as described above, digital content management system 104 creates digital content portion 410b as a digital spreadsheet of individual data cells that are editable and functional like a spreadsheet used in a spreadsheet application such as GOOGLE SHEETS or MICROSOFT EXCEL. Additionally, digital content management system 104 adds digital content portion 410b to digital document 400 in accordance with format characteristics identified within first digital image 300, as previously described.

As shown in FIG. 4, digital content management system 104 further identifies handwritten content portion 412a. In particular, digital content management system 104 analyzes handwritten content portion 412a to determine that handwritten content portion 412a contains command indicator 312 and command tag 314, and that in response to command indicator 312, digital content management system 104 is to insert a file called "fig1.jpg." Furthermore, digital content management system 104 identifies handwritten content portion 412a as an image placeholder. Based on the analysis of digital content portion 412a, digital content management system 104 searches for a file named "fig1.jpg" either on client device 107a or within a database maintained by digital content management system 104. In other embodiments, user 114a provides the file to digital content management system 104. Upon locating the file, digital content management system 104 creates digital content portion 412b to add to digital document 400. Additionally, digital content management system 104 resizes and/or crops the image file "fig1.jpg" to add to digital document 400 and to fit within an area proportional to the handdrawn square designated as the insertion location in first digital image 300, as shown by handwritten content portion 412.

Handwritten content portion 414a, as shown in FIG. 4, is a text portion within first digital image 300. In particular, digital content management system 104 analyzes handwritten content portion 414a to determine that handwritten content portion 414a is related to handwritten content portion 410a and also to determine the proper placement location within digital document 400. Digital content management system 104 creates digital content portion 414b including digital text characters matching the handwritten letters of handwritten content portion 414a. Digital content management system 104 adds digital content portion 414b to digital document 400 in accordance with identified format and placement characteristics, as described above, and as shown in FIG. 4.

Figure 5:
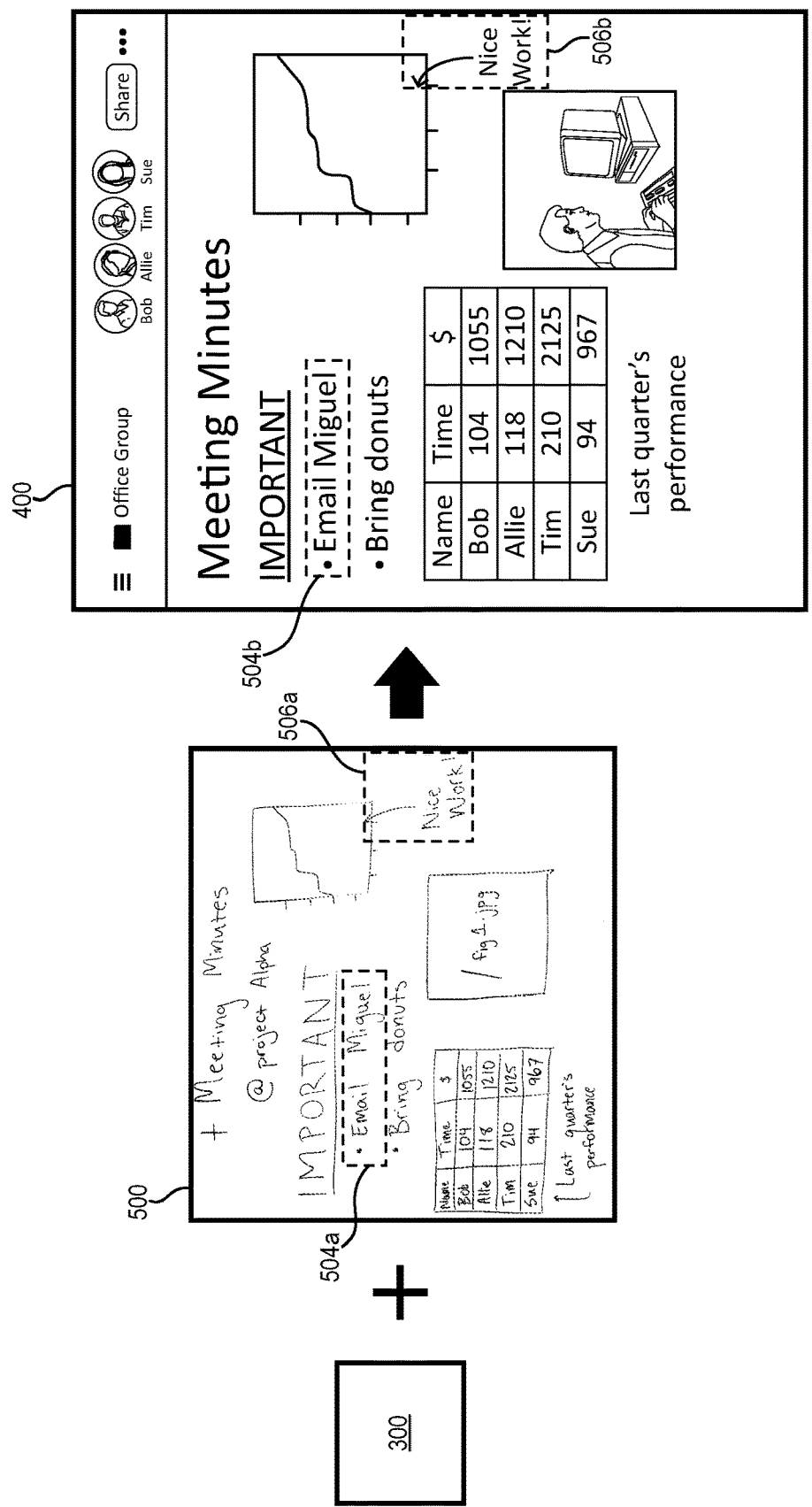
FIG. 5 illustrates an example digital document including updated content portions from a first digital image and a second digital image in accordance with one or more embodiment.

FIG. 5 illustrates first digital image 300, second digital image 500, and digital document 400. In particular, FIG. 5 depicts a conceptual illustration of how digital content management system 104 combines first digital image 300 with second digital image 500 to update digital document 400. For example, digital content management system 104 analyzes first digital image 300 to identify command indicators and content portions as described above with regard to FIGS. 3-4. Additionally, digital content management system 104 receives second digital image 500 including updated handwritten content therein.

To illustrate, in at least one embodiment, user 114a associated with client device 107a makes changes to handwritten content on a whiteboard or a piece of paper. Accordingly, digital content management system 104 receives a new digital image (e.g., second digital image 500) uploaded by user 114a. Upon receiving second digital image 500, digital content management system 104 analyzes second digital image 500 to determine that second digital image 500 is associated with (e.g., an updated version of) first digital image 300. For example, digital content management system 104 identifies matching content portions within first digital image 300 and second digital image 500 and/or identifies matching file names, or titles based on command indicators and command tags. In the same or other embodiments, digital content management system 104 identifies a command indicator associated with a command to combine second digital image 500 with first digital image 300.

In any case, digital content management system 104 analyzes second digital image 500 to further identify differences within the handwritten content of second digital image 500 and first digital image 300 (e.g., newly added content, erased content, altered content, etc.). For example, as shown in FIG. 5, digital content management system 104 identifies handwritten content portion 504a and handwritten content portion 506a within second digital image 500. In particular, digital content management system 104 identifies differences between handwritten content portion 504a and handwritten content portion 408a.

As shown in FIG. 5, handwritten content portion 504a includes a list item within a bulleted list that says, "Email Miguel." Comparing to handwritten content portion 408a of FIG. 4, digital content management system 104 determines that, in context of the bulleted list under the "IMPORTANT" header, the bullet list item "Email Miguel" is intended to replace the bullet list item "call Fred." Therefore, digital content management system 104 creates digital content portion 504b to replace "call Fred" within digital document 400. In at least one other embodiment, digital content management system 104 determines to add the bullet list item "Email Miguel" to the bulleted list within digital document 400 without removing (e.g., deleting) the bullet list item "call Fred," and instead simply appends the new item to the end of the list.

Further illustrated in FIG. 5, digital content management system 104 identifies handwritten content portion 506a as a change to the handwritten content included in first digital image 300. In response to determining that handwritten content portion 506a is not included within first digital image 300 and has therefore not yet been added to digital document 400, digital content management system 104 creates digital content portion 506b including identified characters and symbols. Additionally, digital content management system 104 adds digital content portion 506b to digital document 400 in accordance with identified format and placement characteristics, as described above.

Figure 6:
FIG. 6 illustrates an example digital document including a combination of content portions from a first digital image and a third digital image in accordance with one or more embodiments.

FIG. 6 illustrates first digital image 300, third digital image 600, and digital document 400. In particular, digital content management system 104 combines the handwritten contents of third digital image 600 with first digital image 300. In one or more embodiments, digital content management system 104 alters digital document 400 in accordance with identified differences between third digital image 600 and first digital image 300.

For example, digital content management system 104 analyzes third digital image 600 and compares the handwritten contents therein with the digital contents previously added to digital document 400 to identify differences. In the same or other embodiments, digital content management system 104 analyzes third digital image 600 and compares the handwritten contents therein with the handwritten contents identified within first digital image 300. In any case, digital content management system 104 identifies handwritten content within third digital image 600 to add to digital document 400. In these or other embodiments, third digital image 600 is a separately written piece of handwritten content, independent of first digital image 300. For example, third digital image 600 may be a page of notes taken by an attendee of a business meeting, while first digital image 300 may be the meeting minutes written on the whiteboard.

To associate third digital image 600 with first digital image 300 and/or digital document 400 (e.g., to determine a relationship), digital content management system 104 identifies similarities within the handwritten content and/or digital content. Additionally or alternatively, digital content management system identifies a command indicator associated with a command to link (e.g., combine) third digital image 600 with first digital image 300 and/or digital document 400. Indeed, in some embodiments, digital document 400 exists prior to digital content management system 104 receiving third digital image 600. In other embodiments, digital content management system 104 receives first digital image 300 together with third digital image 600 before combining them to create digital document 400.

In one or more embodiments, digital content management system 104 identifies a quick response ("QR") code 604 within third digital image 600. In these or other embodiments, QR code 604 includes information (e.g., an identifier) establishing a relationship between third digital image 600 and digital document 400. In response to identifying QR code 604, digital content management system 104 determines that third digital image 604 is associated with digital document 400 and that, therefore, the digital content portions created from handwritten content identified within third digital image 600 are to be added to digital document 400.

As illustrated in FIG. 6, digital document 400 includes digital content portions from first digital image 300 as well as from third digital image 600. For example, digital content management system 104 creates digital content portions from the identified handwritten content within third digital image 600 and adds the created digital content portions to digital document 400. Additionally, digital content management system 104 arranges and/or formats digital content portions identified within third digital image 600 and added to digital document 400 in accordance with identified format characteristics. In this way, digital content management system 104 performs a sort of merge-and-compare function to combine two or more digital images when creating and/or adding to digital document 400.

Figure 7:
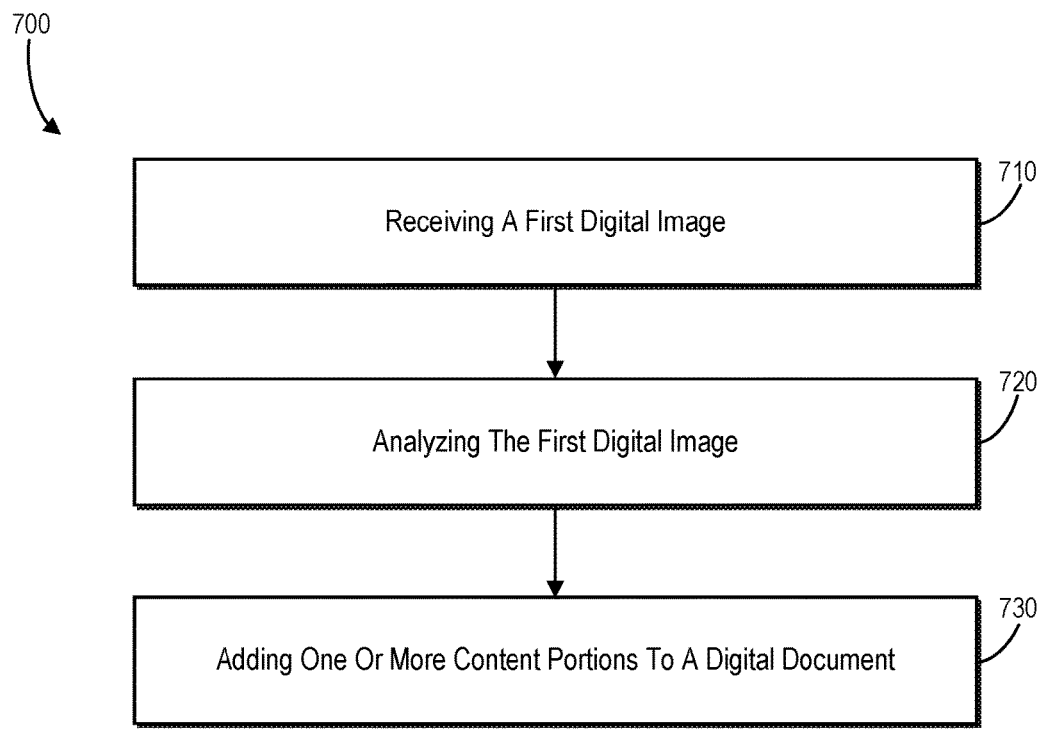
FIG. 7 illustrates a flowchart of a series of acts in a method of adding content portions to a digital document in accordance with one or more embodiments.

FIG. 7 illustrates a flowchart of a series of acts in method 700 of creating a digital document from an image of handwritten content. Method 700 includes act 710 of receiving a first digital image. In particular, act 710 can involve receiving a first digital image comprising handwritten content, wherein the handwritten content comprises at least one command indicator and at least one content portion.

Method 700 further includes act 720 of analyzing the first digital image. In particular, act 720 can involve analyzing the first digital image to identify a first command indicator and one or more content portions within the handwritten content of the first digital image. In some embodiments, the one or more content portions within the handwritten content can include one or more of handwritten text or a handdrawn figure. Additionally, method 700 can further include an act of identifying a second command indicator based on the analysis of the first digital image, as described above. As also described above, the one or more content portions within the handwritten content can include handwritten text and/or figures. Furthermore, the first command indicator can include a handwritten symbol.

In addition, method 700 further includes act 730 of adding one or more content portions to a digital document. In particular, act 730 can involve adding, based on a first command associated with the first command indicator, the one or more content portions within the handwritten content to a digital document.

Furthermore, act 730 can also involve adding the one or more content portions within the handwritten content to the digital document by creating a digital content portion for each of the one or more content portions within the handwritten content, and adding the digital content portion to the digital document. Additionally, creating the digital content portion for each of the one or more content portions can include converting handwritten text within the one or more content portions identified within the digital image into digital text. The act 730 can further include adding the one or more content portions within the handwritten content to the matching digital document In one or more embodiments, method 700 can further include an act of identifying a file name used in conjunction with the first command indicator within the first digital image. The method 700 can also include an act of searching, based on the file name, a digital content management system to locate a matching digital document using the file name.

Additionally or alternatively, method 700 can include an act of creating, in response to determining that the matching digital document does not exist within the digital content management system, the digital document, wherein adding the one or more content portions within the handwritten content to the digital document can further include adding the one or more content portions within the handwritten content to the created digital document.

In the same or alternative embodiments, method 700 can include acts of sending, based on a second command associated with the second command indicator, an invitation to join a group associated with the digital document to one or more users of a digital content management system. In these or other embodiments, method 700 can include an act of inserting, based on a second command associated with the second command indicator, a figure within the digital document.

Method 700 can further include an act of creating, based on a second command associated with the second command indicator, a task list including at least one task assignment. In addition, the method 700 can include an act of identifying one or more user names used in conjunction with the second command indicator. The method can further include an act of sending, to one or more users associated with the one or more user names, an invitation to access the task list.

In these or other embodiments, method 700 can further include an act of receiving a second digital image including one or more changes to the one or more content portions within the handwritten content. Method 700 can still further include acts of analyzing the second digital image to identify differences between the first digital image and the second digital image, and/or updating, in response to identifying differences between the first digital image and the second digital image, the digital document to reflect the differences between the first digital image and the second digital image.

Additionally or alternatively, method 700 can include an act of receiving a second digital image associated with a second user and comprising additional handwritten content, wherein the additional handwritten content comprises a second command indicator and one or more additional content portions. Method 700 can still further include an act of analyzing the second digital image to identify the second command indicator and the one or more additional content portions. Furthermore, method 700 can include acts of, based on determining the second command indicator from the second digital image matches the first command indicator within the first digital image: adding the one or more additional content portions from the second digital image to the digital document; and sharing the digital document with the first user and the second user.

In the same or other embodiments, method 700 may include acts of identifying a first user associated with the first digital image, and receiving a second digital image associated with a second user and including the first command indicator and one or more different content portions. Additionally or alternatively, method 700 may further include acts of analyzing the second digital image to identify the first command indicator and the one or more different content portions as well as creating, in response to identifying the first command indicator within both the first digital image and the second digital image, a digital document shared with the first user and the second user, and/or wherein adding the one or more content portions within the handwritten content to the digital document includes adding, based on identifying the first command indicator within both the first digital image and the second digital image, the one or more content portions within the handwritten content identified in the first digital image and the second digital image to the digital document shared with the first user and the second user.

Method 700 may further include an act of detecting format characteristics of the one or more content portions within the handwritten content of the first digital image, and an act of formatting the one or more content portions within the digital document to correspond to the format characteristics of the one or more content portions within the handwritten content of the first digital image.

Figure 8:
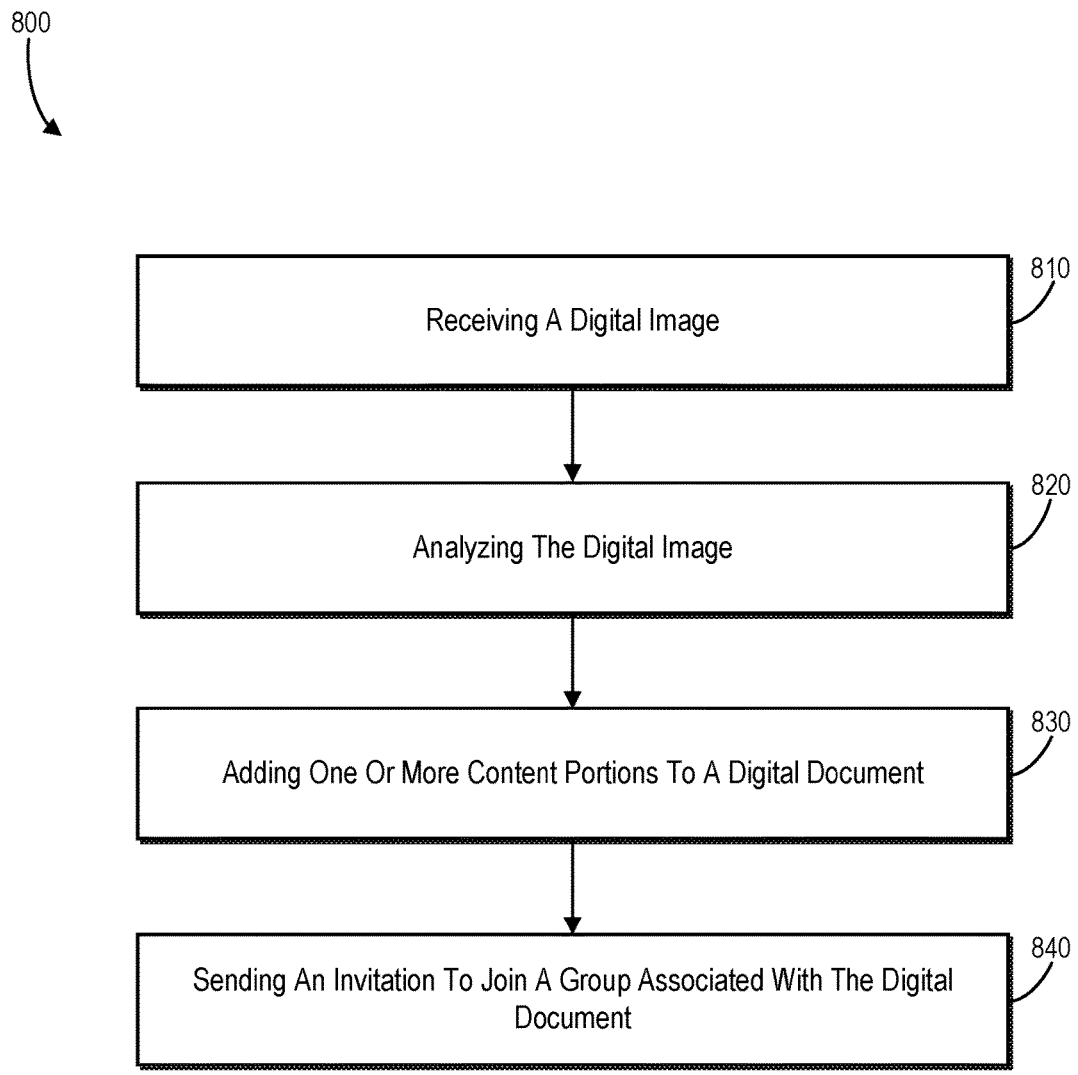
FIG. 8 illustrates a flowchart of a series of acts in a method of adding digital content portions to a digital document in accordance with one or more embodiments.

FIG. 8 illustrates a flowchart of a series of acts in method 800 of creating a digital document from an image of handwritten content and sending an invitation to access the digital document to a user or group of users. For example, method 800 includes act 810 of receiving a digital image. Similar to method 700 described above, act 810 can involve receiving a digital image including handwritten content, wherein the handwritten content includes a plurality of command indicators and at least one content portion.

Method 800 further includes act 820 of analyzing the digital image, as shown in FIG. 8. In particular, act 820 can involve analyzing the digital image to identify a first command indicator, a second command indicator, and one or more content portions within the handwritten content. In addition, act 820 can further involve identifying one or more text portions within the digital image and identifying one or more figure portions within the digital image. As mentioned, the one or more figure portions may be a chart, a table, a list, a graph, an image, a spreadsheet, an equation, a text box, or a link.

Additionally, method 800 further includes act 830 of adding one or more content portions to a digital document. In particular, act 830 can involve adding, based on a first command associated with the first command indicator, the one or more content portions within the handwritten content to a digital document.

As shown in FIG. 8, method 800 further includes act 840 of sending an invitation to join a group associated with the digital document. In particular, act 840 can involve sending, based on a second command associated with the second command indicator, an invitation to join a group associated with the digital document to one or more users of a digital content management system.

In at least one embodiment, method 800 can further include acts of identifying, within the digital image, an arrangement of content portions relative to each other, and arranging, within the digital document, the one or more content portions relative to each other based on the identified arrangement within the digital image.

Figure 9:
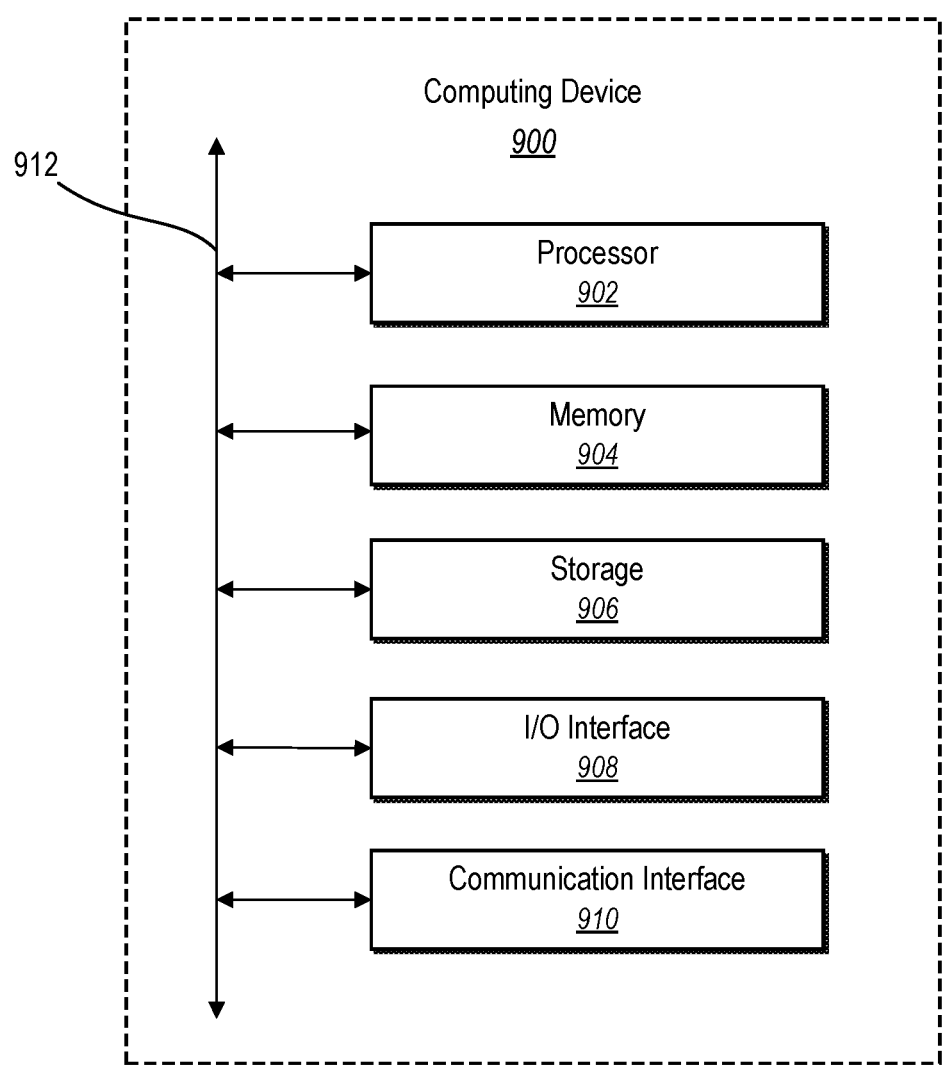
FIG. 9 illustrates a block diagram of an example computing device in accordance with one or more embodiments.

FIG. 9 illustrates a block diagram of exemplary computing device 900 that may be configured to perform one or more of the processes described above. One will appreciate that server(s) 102 and/or client devices 107a-107n may comprise one or more computing devices such as computing device 900. As shown by FIG. 9, computing device 900 can comprise processor 902, memory 904, storage device 906, I/O interface 908, and communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other embodiments. Furthermore, in certain embodiments, computing device 900 can include fewer components than those shown in FIG. 9. Components of computing device 900 shown in FIG. 9 will now be described in additional detail.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage device 906 and decode and execute them. In particular embodiments, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage device 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular embodiments, storage device 906 is non-volatile, solid-state memory. In other embodiments, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
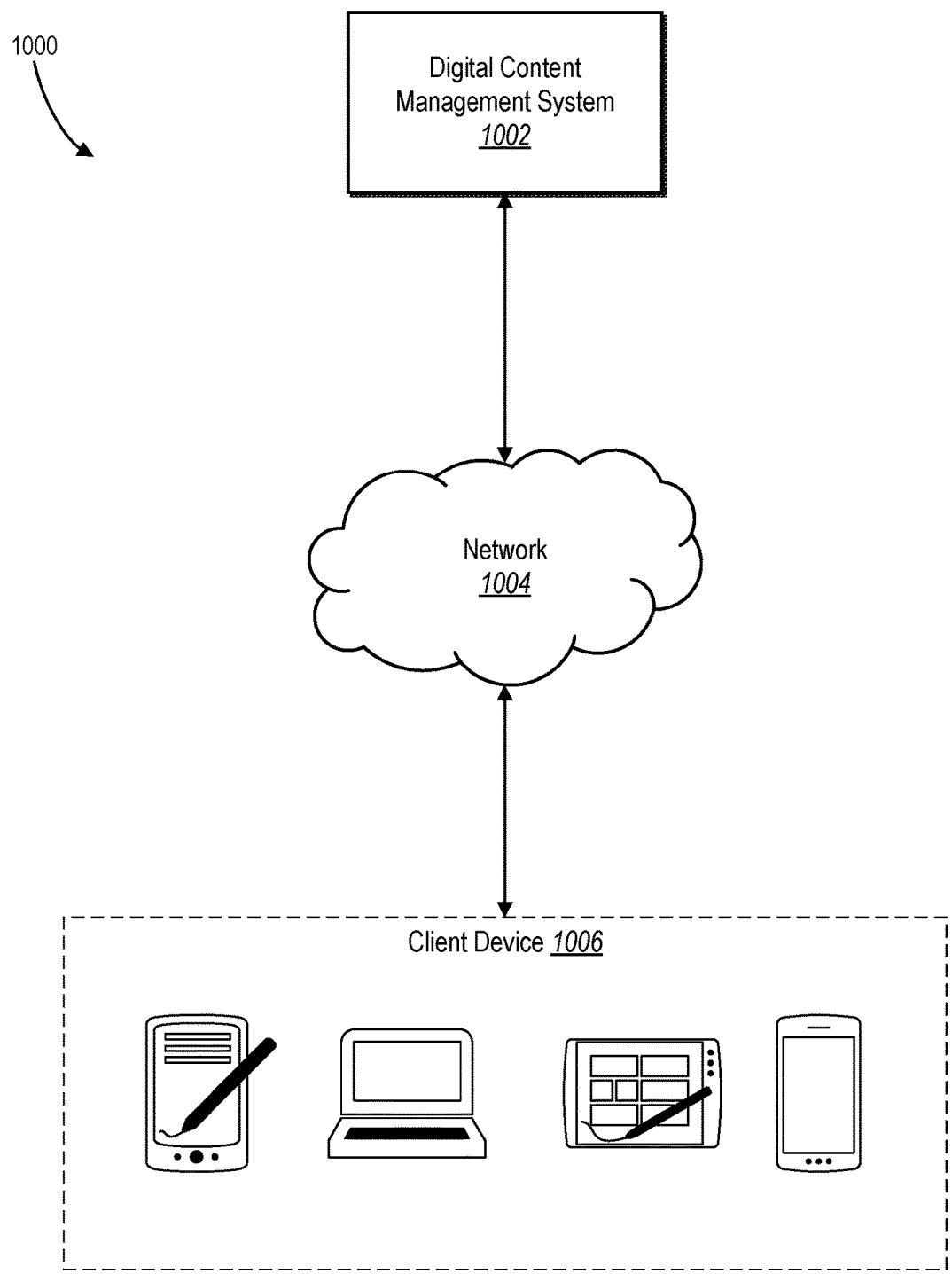
FIG. 10 illustrates an example networking environment of a digital content management system in accordance with one or more embodiments.

FIG. 10 is a schematic diagram illustrating an environment within which one or more embodiments of the document hosting system 102 can be implemented. Document hosting system 1002 may generate, store, manage, receive, and send digital content (such as digital videos). For example, document hosting system 1002 may send and receive digital content to and from client devices 1006 by way of network 1004. In particular, document hosting system 1002 can store and manage a collection of digital content. Document hosting system 1002 can manage the sharing of digital content between computing devices associated with a plurality of users. For instance, document hosting system 1002 can facilitate a user sharing a digital content with another user of document hosting system 1002.

In particular, document hosting system 1002 can manage synchronizing digital content across multiple client devices 1006 associated with one or more users. For example, a user may edit digital content using client device 1006. The document hosting system 1002 can cause client device 1006 to send the edited digital content to document hosting system 1002. Document hosting system 1002 then synchronizes the edited digital content on one or more additional computing devices.

In addition to synchronizing digital content across multiple devices, one or more embodiments of document hosting system 1002 can provide an efficient storage option for users that have large collections of digital content. For example, document hosting system 1002 can store a collection of digital content on document hosting system 1002, while the client device 1006 only stores reduced-sized versions of the digital content. A user can navigate and browse the reduced-sized versions (e.g., a thumbnail of a digital image) of the digital content on client device 1006. In particular, one way in which a user can experience digital content is to browse the reduced-sized versions of the digital content on client device 1006.

Another way in which a user can experience digital content is to select a reduced-size version of digital content to request the full- or high-resolution version of digital content from document hosting system 1002. In particular, upon a user selecting a reduced-sized version of digital content, client device 1006 sends a request to document hosting system 1002 requesting the digital content associated with the reduced-sized version of the digital content. Document hosting system 1002 can respond to the request by sending the digital content to client device 1006. Client device 1006, upon receiving the digital content, can then present the digital content to the user. In this way, a user can have access to large collections of digital content while minimizing the amount of resources used on client device 1006.

Client device 1006 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1006 may access document hosting system 1002.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
    receiving a first digital image comprising handwritten content, wherein the handwritten content comprises at least one command indicator and at least one content portion;
    analyzing the first digital image to identify a first command indicator and one or more content portions within the handwritten content of the first digital image;
    identifying a file name used in conjunction with the first command indicator within the first digital image;
    searching, based on the file name, a digital content management system to locate a matching digital document using the file name; and
    adding, based on a first command associated with the first command indicator, the one or more content portions within the handwritten content to the matching digital document.

2. The method of claim 1, wherein adding the one or more content portions within the handwritten content to the matching digital document comprises:
    creating a digital content portion for each of the one or more content portions within the handwritten content; and
    adding the digital content portion to the matching digital document.

3. The method of claim 2, wherein creating the digital content portion for each of the one or more content portions comprises converting handwritten text within the one or more content portions identified within the digital image into digital text.

4. The method of claim 1, wherein the one or more content portions within the handwritten content comprise one or more of handwritten text or a handdrawn figure.

5. The method of claim 1, wherein the first command indicator comprises a handwritten symbol.

6. The method of claim 1, further comprising:
    identifying an arrangement of content portions within the first digital image; and
    arranging the one or more content portions within the matching digital document based on the arrangement of content portions within the first digital image.

7. The method of claim 1, further comprising:
    identifying a second file name used in conjunction with the first command indicator within the first digital image;
    searching, based on the second file name, the digital content management system to determine that a second matching digital document using the second file name does not exist within the digital content management system;
    creating, in response to determining that the second matching digital document does not exist within the digital content management system, a second digital document; and
    adding the one or more content portions within the handwritten content to the second digital document.

8. The method of claim 1, further comprising identifying a second command indicator based on the analysis of the first digital image.

9. The method of claim 8, further comprising sending, based on a second command associated with the second command indicator, an invitation to join a group associated with the matching digital document to one or more users of the digital content management system.

10. The method of claim 8, further comprising inserting, based on a second command associated with the second command indicator, a figure within the matching digital document.

11. The method of claim 8, further comprising:
    creating, based on a second command associated with the second command indicator, a task list comprising at least one task assignment;
    identifying one or more user names used in conjunction with the second command indicator; and
    sending, to one or more users associated with the one or more user names, an invitation to access the task list.

12. The method of claim 1, further comprising:
    receiving a second digital image comprising one or more changes to the one or more content portions within the handwritten content;
    analyzing the second digital image to identify differences between the first digital image and the second digital image; and
    updating, in response to identifying differences between the first digital image and the second digital image, the matching digital document to reflect the differences between the first digital image and the second digital image.

13. The method of claim 1, further comprising:
    receiving a second digital image comprising one or more additional content portions;
    analyzing the second digital image to identify the one or more additional content portions; and
    adding, based on identifying the one or more additional content portions, the one or more additional content portions of the second digital image to the matching digital document.

14. The method of claim 1, further comprising:
    identifying a first user associated with the first digital image;
    receiving a second digital image associated with a second user and comprising additional handwritten content, wherein the additional handwritten content comprises a second command indicator and one or more additional content portions;

analyzing the second digital image to identify the second command indicator and the one or more additional content portions; and based on determining the second command indicator from the second digital image matches the first command indicator within the first digital image:

adding the one or more additional content portions from the second digital image to the matching digital document; and sharing the matching digital document with the first user and the second user.

15. A non-transitory computer readable medium storing instructions thereon that, when executed by at least one processor, cause a computer system to:

receive a digital image comprising handwritten content, wherein the handwritten content comprises a plurality of command indicators and at least one content portion;

analyze the digital image to identify a first command indicator and one or more content portions within the handwritten content;

identify a file name used in conjunction with the first command indicator within the first digital image;

search, based on the file name, a digital content management system to locate a matching digital document using the file name; and add, based on a first command associated with the first command indicator, the one or more content portions within the handwritten content to the matching digital document.

16. The non-transitory computer readable medium of claim 15, wherein identifying the one or more content portions comprises:

identifying one or more text portions within the digital image; and identifying one or more figure portions within the digital image.

17. The non-transitory computer readable medium of claim 16, wherein the one or more figure portions comprise one or more of a chart, a table, a list, a graph, an image, a spreadsheet, an equation, a text box, or a link.

18. The non-transitory computer readable medium of claim 16, further comprising instructions that, when executed by the at least one processor, cause the computer system to:

identify, within the digital image, an arrangement of content portions relative to each other; and arrange, within the matching digital document, the one or more content portions relative to each other based on the identified arrangement within the digital image.

19. A system comprising:

at least one processor; and at least one non-transitory computer readable storage medium storing instructions thereon that, when executed by the at least one processor, cause the system to:

receive a first digital image comprising handwritten content, wherein the handwritten content comprises at least one command indicator and at least one content portion;

analyze the first digital image to identify a first command indicator and one or more content portions within the handwritten content of the first digital image;

identify a file name used in conjunction with the first command indicator within the first digital image;

search, based on the file name, a digital content management system to locate a matching digital document using the file name; and add, based on a first command associated with the first command indicator, the one or more content portions within the handwritten content to the matching digital document.

20. The system of claim 19, further comprising instructions that, when executed by the at least one processor, further cause the system to:

detect formatting characteristics of the one or more content portions within the handwritten content of the first digital image; and format the one or more content portions within the matching digital document to correspond to the format characteristics of the one or more content portions within the handwritten content of the first digital image.

* * * * *